United States Patent
Li et al.

(10) Patent No.: US 11,496,252 B2
(45) Date of Patent: Nov. 8, 2022

(54) UE CONFIGURED FOR TYPE-2 HARQ-ACK CODEBOOK GROUPING AND HARQ-ACK RETRANSMISSION

(71) Applicant: Intel Corporation, Santa Clara, CA (US)

(72) Inventors: Yingyang Li, Beijing (CN); Yongjun Kwak, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 17/061,215

(22) Filed: Oct. 1, 2020

(65) Prior Publication Data

US 2021/0105102 A1   Apr. 8, 2021

Related U.S. Application Data

(60) Provisional application No. 62/932,318, filed on Nov. 7, 2019, provisional application No. 62/909,529, filed on Oct. 2, 2019.

(51) Int. Cl.
*H04L 1/18* (2006.01)
*H04W 74/08* (2009.01)
*H04W 72/04* (2009.01)

(52) U.S. Cl.
CPC ......... *H04L 1/1861* (2013.01); *H04W 72/042* (2013.01); *H04W 74/0808* (2013.01)

(58) Field of Classification Search
CPC ... H04L 1/1861; H04L 1/1822; H04L 1/1854; H04L 1/1896; H04W 72/042; H04W 74/0808
See application file for complete search history.

(56) References Cited

U.S. PATENT DOCUMENTS

| | | | | |
|---|---|---|---|---|
| 2019/0230685 A1* | 7/2019 | Park | ............... | H04W 72/0453 |
| 2019/0297618 A1* | 9/2019 | Yang | ............... | H04W 72/0406 |
| 2020/0344010 A1* | 10/2020 | Lei | ............... | H04W 72/0446 |
| 2022/0014314 A1* | 1/2022 | Wang | ............... | H04L 5/0053 |

* cited by examiner

*Primary Examiner* — John D Blanton
(74) *Attorney, Agent, or Firm* — Schwegman Lundberg & Woessner, P.A.

(57) ABSTRACT

A user equipment (UE) configured for operation in a fifth-generation new radio (5G NR) system may be configured for Type-2 Hybrid automatic repeat request (HARQ) acknowledge (ACK) (HARQ-ACK) codebook grouping and HARQ-ACK retransmission. The UE may decode a downlink control information (DCI) format for scheduling a physical downlink shared channel (PDSCH) group of one or more PDSCHs. The DCI format may include a downlink assignment index (DAI) comprising a counter DAI (C-DAI) for the scheduled PDSCH group. The DCI format may also include a total DAI (T-DAI) for at least one of the scheduled PDSCH group and a non-scheduled PDSCH group. When the DCI format includes a new feedback indicator field for at least one of the scheduled PDSCH group and the non-scheduled PDSCH group, the UE may multiplex HARQ-ACK bits only for PDSCH receptions for transmission in a PUCCH transmission occasion scheduled by the DCI format and may refrain from multiplexing HARQ-ACK bits for PDSCH receptions that are not scheduled by the DCI format. For HARQ-ACK retransmission, the UE may retransmit HARQ-ACK bits from more than one PDSCH group in the PUCCH transmission occasion.

20 Claims, 8 Drawing Sheets

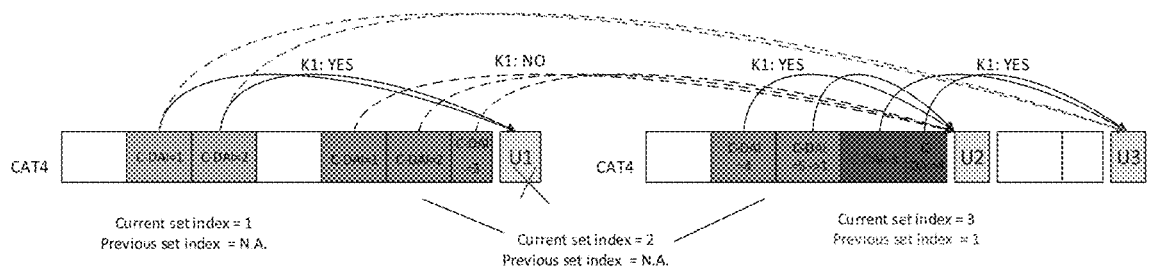
FIG. 1A: HARQ-ACK codebook based on current set index and previous set index
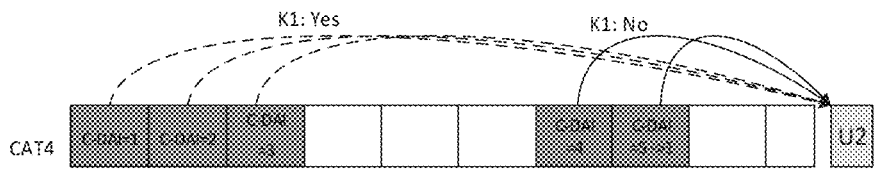
FIG. 1B: HARQ-ACK with undefined K1 values
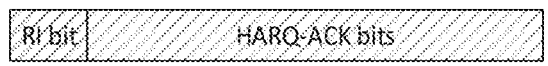
FIG. 1C: UCI payload
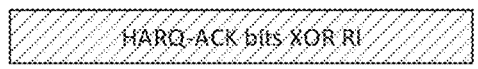
FIG. 1D: UCI payload
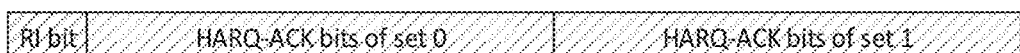
FIG. 1E: UCI payload
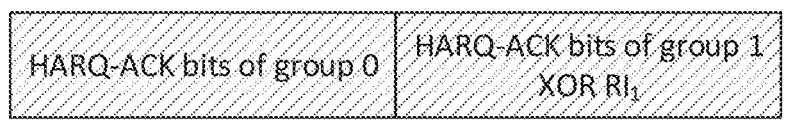
FIG. 1F: UCI payload
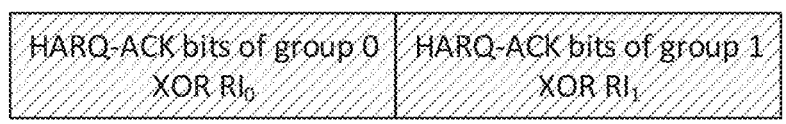
FIG. 1G: UCI payload

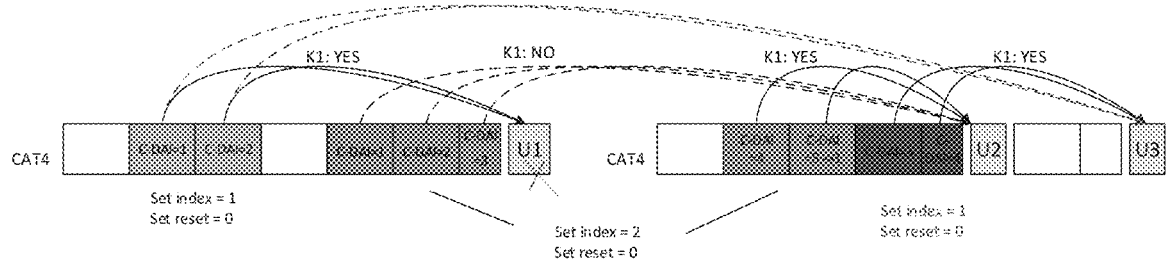
FIG. 2: HARQ-ACK codebook based on set index and restart indication not toggled
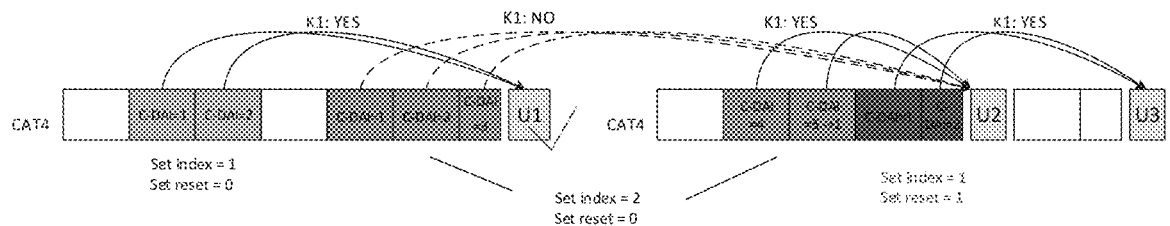
FIG. 3A: HARQ-ACK codebook based on set index and restart indication toggled
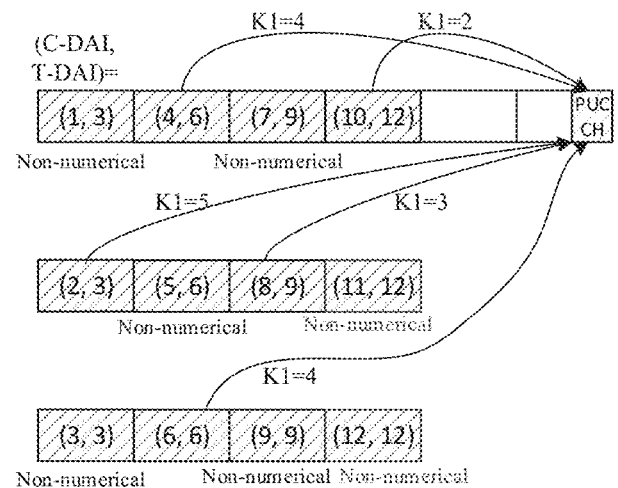
FIG. 3B: HARQ-ACK with undefined K1 values

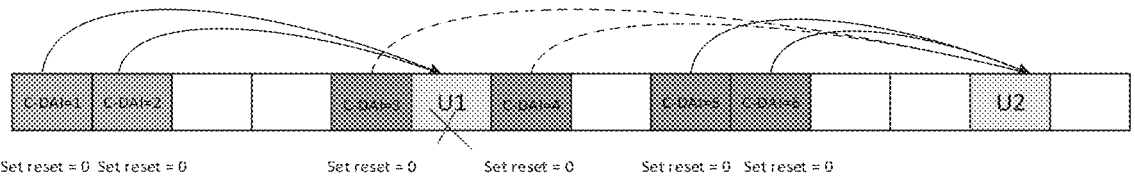
FIG. 20: HARQ-ACK transmission for a set of PDSCHs
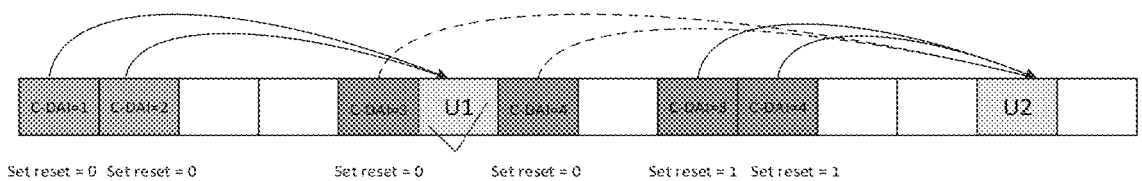
FIG. 21: HARQ-ACK transmission for a set of PDSCHs
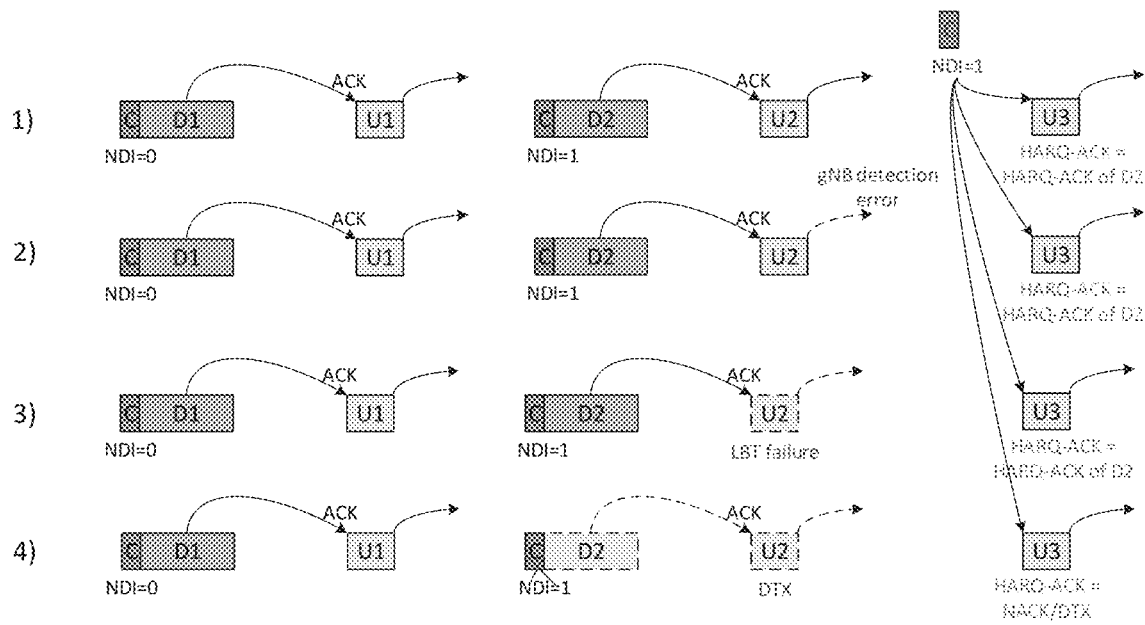
FIG. 4: Cases for HARQ-ACK status of a HARQ process

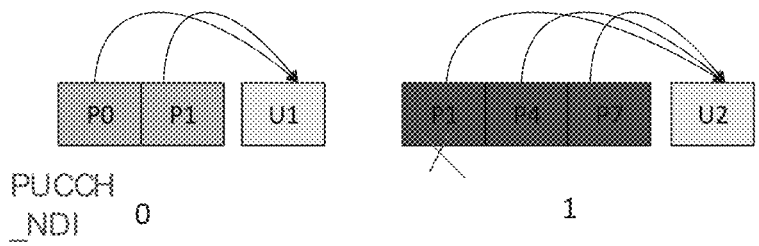
FIG. 5: Use of PUCCH_NDI
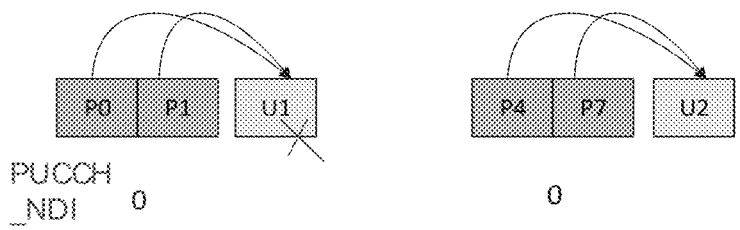
FIG. 6: Use of PUCCH_NDI
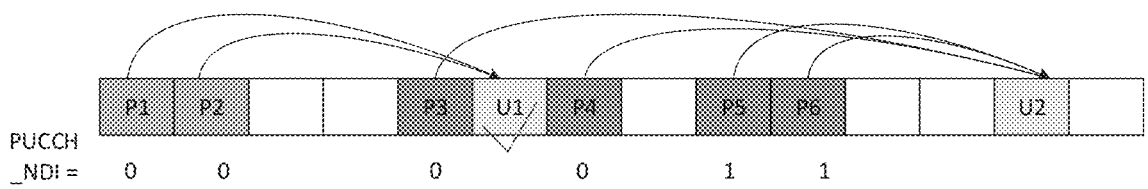
FIG. 15: HARQ-ACK transmission for a set of PDSCHs
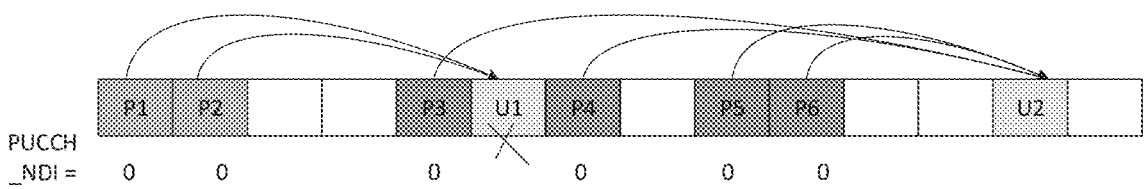
FIG. 16: HARQ-ACK transmission for a set of PDSCHs
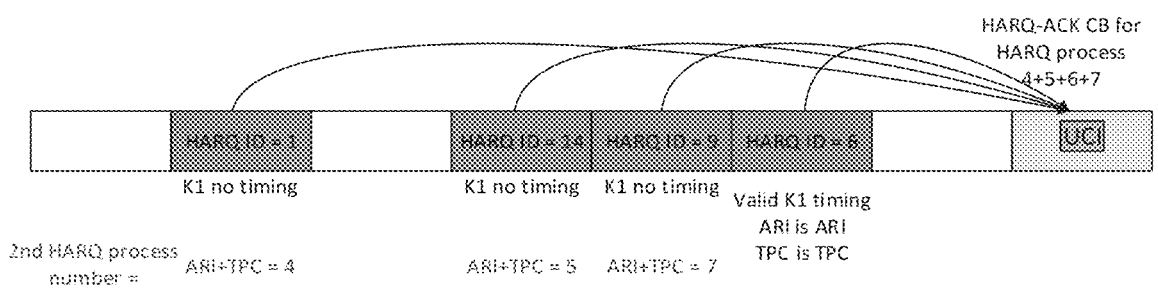
FIG. 17: use second HARQ process number to form HARQ-ACK codebook

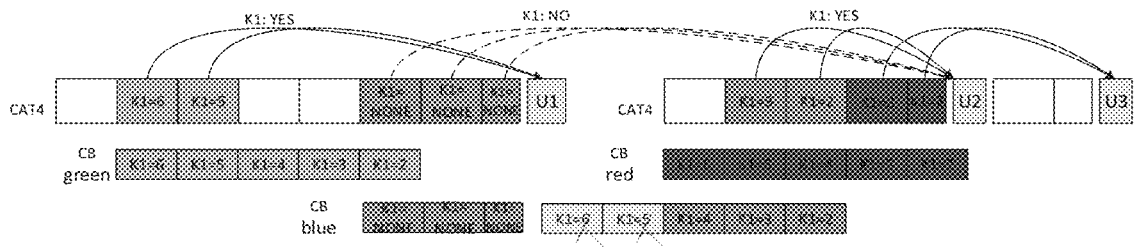
FIG. 7: Semi-static HARQ-ACK codebook considering PDSCHs without PDSCH-to-HARQ-ACK timings
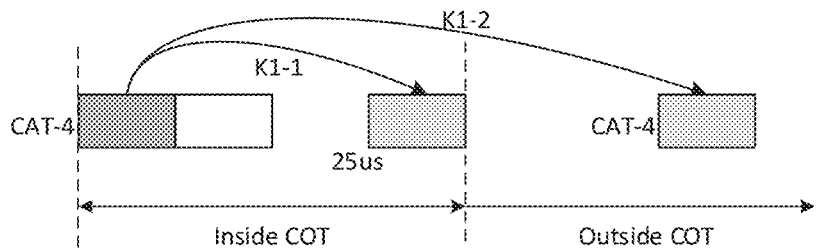
FIG. 11: Different LBT type for the multiple K1 values
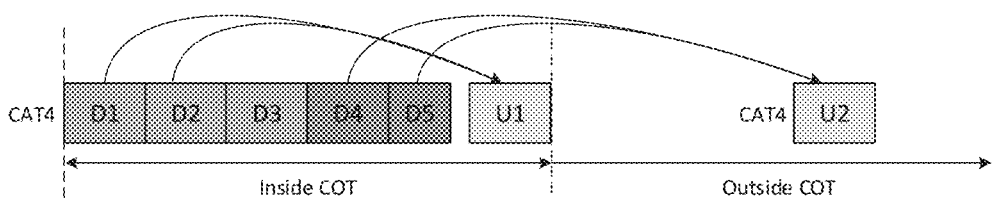
FIG. 12: CAT-4 LBT used outside COT
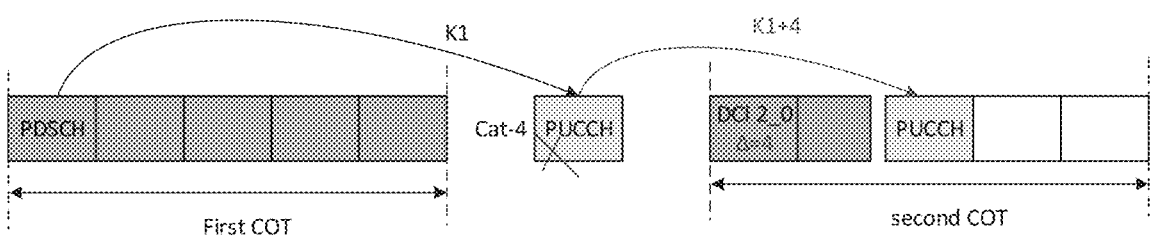
FIG. 13: Group triggering HARQ-ACK retransmission

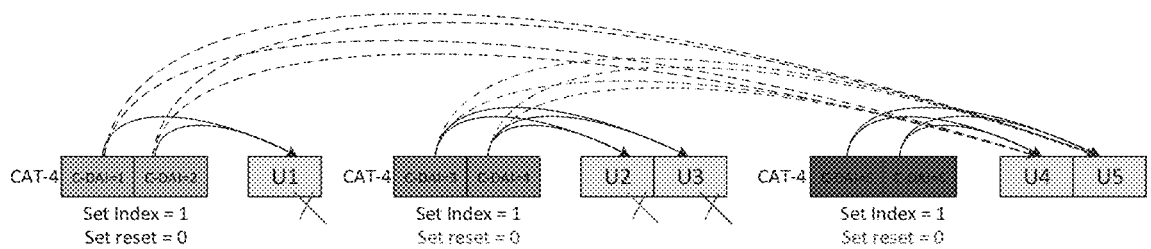
FIG. 8: Multiple K1 values indicated by a DCI
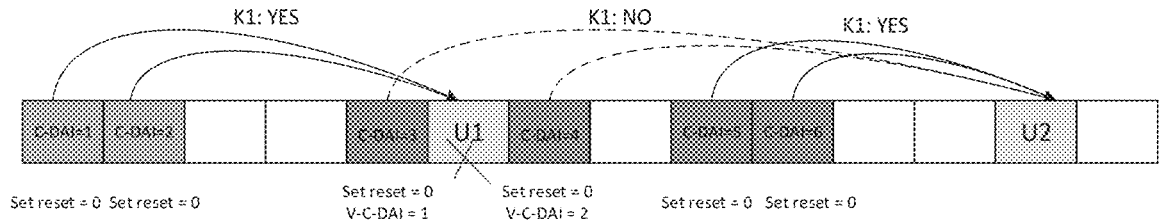
FIG. 9: HARQ-ACK transmission for a set of PDSCHs
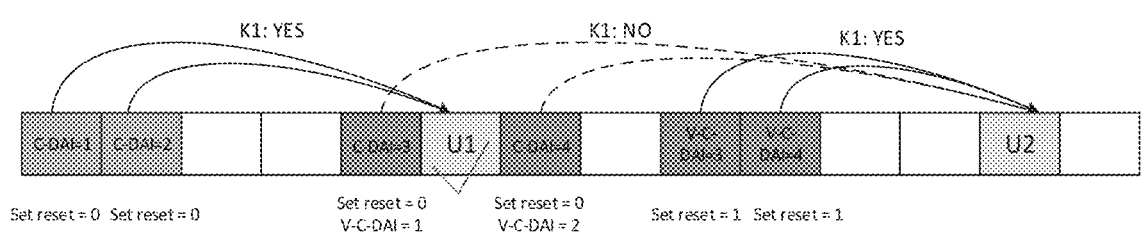
FIG. 10: HARQ-ACK transmission for a set of PDSCHs
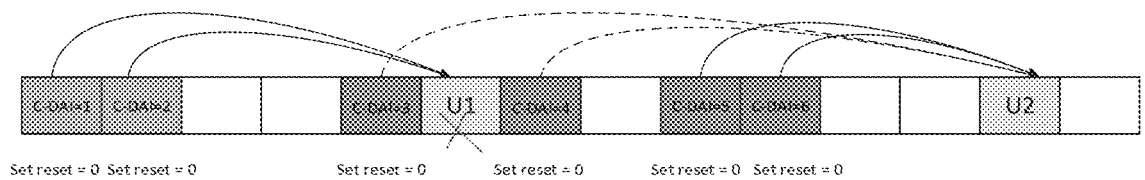
FIG. 18: HARQ-ACK transmission for a set of PDSCHs
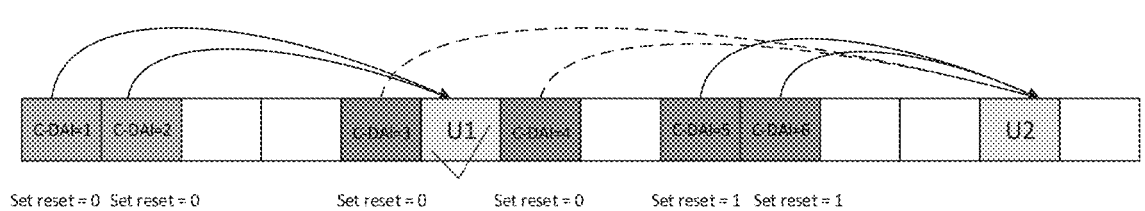
FIG. 19: HARQ-ACK transmission for a set of PDSCHs

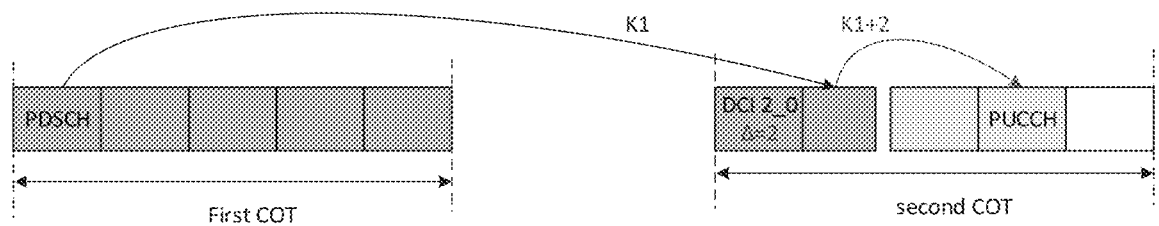
FIG. 14: Group triggering HARQ-ACK retransmission

UE CONFIGURED FOR TYPE-2 HARQ-ACK CODEBOOK GROUPING AND HARQ-ACK RETRANSMISSION

PRIORITY CLAIMS

This application claims priority under 35 USC 119(e) to U.S. Provisional Patent Application Ser. No. 62/909,529, filed Oct. 2, 2019, and U.S. Provisional Patent Application Ser. No. 62/932,318, filed Nov. 7, 2019, which are incorporated herein by reference in its entireties.

TECHNICAL FIELD

Embodiments pertain to wireless communications. Some embodiments relate to fifth generation (5G) new radio (NR) communications. Some embodiments pertain to hybrid automatic repeat request (HARQ) and HARQ acknowledgement (HARQ-ACK) scheduling for NR unlicensed (NR-U) spectrum usage.

BACKGROUND

After a PSDCH is transmitted by gNB, a UE may transmit a PUCCH carrying the HARQ-ACK information. This may be difficult in NR-U due to the listen-before-talk (LBT) requirements. Thus, what is needed are HARQ-ACK scheduling and an HARQ timing procedure for NR-U for efficient operation in unlicensed spectrum.

BRIEF DESCRIPTION OF THE DRAWINGS

FIG. 1A illustrates HARQ-ACK codebook based on current set index and previous set index in accordance with some embodiments.

FIG. 1B illustrates HARQ-ACK with undefined K1 values in accordance with some embodiments.

FIG. 1C illustrates a UCI payload in accordance with some embodiments.

FIG. 1D illustrates a UCI payload in accordance with some embodiments.

FIG. 1E illustrates a UCI payload in accordance with some embodiments.

FIG. 1F illustrates a UCI payload in accordance with some embodiments.

FIG. 1G illustrates a UCI payload in accordance with some embodiments.

FIG. 2 illustrates HARQ-ACK codebook based on set index and restart indication not toggled in accordance with some embodiments.

FIG. 3A illustrates HARQ-ACK codebook based on set index and restart indication toggled in accordance with some embodiments.

FIG. 3B illustrates HARQ-ACK with undefined K1 values in accordance with some embodiments.

FIG. 4 illustrates cases for HARQ-ACK status of a HARQ process in accordance with some embodiments.

FIG. 5 illustrates the use of a PUCCH_NDI in accordance with some embodiments.

FIG. 6 illustrates the use of a PUCCH_NDI in accordance with some embodiments.

FIG. 7 illustrates a semi-static HARQ-ACK codebook considering PDSCHs without PDSCH-to-HARQ-ACK timings in accordance with some embodiments.

FIG. 8 illustrates multiple K1 values indicated by a DCI in accordance with some embodiments.

FIG. 9 illustrates HARQ-ACK transmission for a set of PDSCHs in accordance with some embodiments.

FIG. 10 illustrates HARQ-ACK transmission for a set of PDSCHs in accordance with some embodiments.

FIG. 11 illustrates different LBT type for the multiple K1 values in accordance with some embodiments.

FIG. 12 illustrates CAT-4 LBT used outside COT in accordance with some embodiments.

FIG. 13 illustrates group triggering of HARQ-ACK retransmission in accordance with some embodiments.

FIG. 14 illustrates group triggering of HARQ-ACK retransmission in accordance with some embodiments.

FIG. 15 illustrates HARQ-ACK transmission for a set of PDSCHs in accordance with some embodiments.

FIG. 16 illustrates HARQ-ACK transmission for a set of PDSCHs in accordance with some embodiments.

FIG. 17 illustrates use of second HARQ process number to form HARQ-ACK codebook in accordance with some embodiments.

FIG. 18 illustrates HARQ-ACK transmission for a set of PDSCHs in accordance with some embodiments.

FIG. 19 illustrates HARQ-ACK transmission for a set of PDSCHs in accordance with some embodiments.

FIG. 20 illustrates HARQ-ACK transmission for a set of PDSCHs in accordance with some embodiments.

FIG. 21 illustrates HARQ-ACK transmission for a set of PDSCHs in accordance with some embodiments.

DETAILED DESCRIPTION

Figure 22:
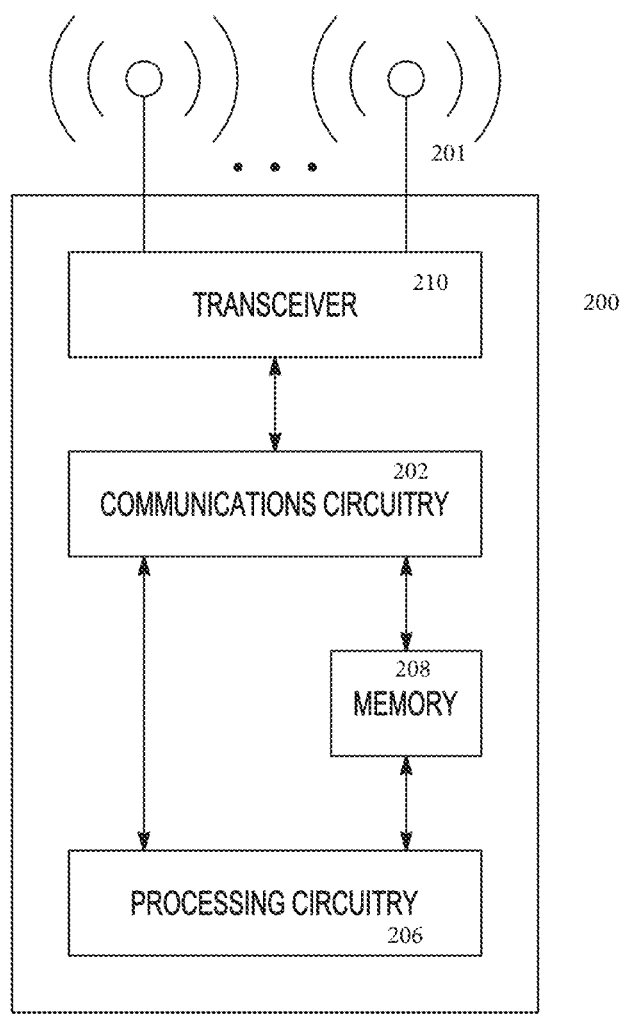
FIG. 22 illustrates a wireless communication device in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various embodiments disclosed herein are directed to a user equipment (UE) configured for operation in a fifth-generation new radio (5G NR) system. In these embodiments, the UE may be configured for Type-2 Hybrid automatic repeat request (HARQ) acknowledge (ACK) (HARQ-ACK) codebook grouping and HARQ-ACK retransmission. In these embodiments, the UE may decode a downlink control information (DCI) format for scheduling a physical downlink shared channel (PDSCH) group of one or more PDSCHs. The DCI format may include a downlink assignment index (DAI) comprising a counter DAI (C-DAI) for the scheduled PDSCH group. The DCI format may also include a total DAI (T-DAI) for at least one of the scheduled PDSCH group and a non-scheduled PDSCH group. In these embodiments, when Type-2 HARQ-ACK codebook grouping and HARQ-ACK retransmission is configured, and when the DCI format includes a new feedback indicator field for at least one of the scheduled PDSCH group and the non-scheduled PDSCH group, the UE may multiplex HARQ-ACK bits only for PDSCH receptions for transmission in a PUCCH transmission occasion scheduled by the DCI format and may refrain from multiplexing HARQ-ACK bits for PDSCH receptions that are not scheduled by the DCI format. In these embodiments, for HARQ-ACK retransmission, the UE may retransmit HARQ-ACK bits from more than one PDSCH group in the PUCCH transmission occasion scheduled by the DCI format.

In some embodiments, the DCI format may be for scheduling a PDSCH group of two or more PDSCHs, although the scope of the embodiments is not limited in this respect. In some embodiments, the T-DAI may be for a scheduled PDSCH or a non-scheduled PDSCH. Depending on the RRC configuration, a DCI 1_1 may include either a T-DAI for a scheduled PDSCH group only or T-DAIs for both scheduled and non-scheduled PDSCH groups. Depending on the RRC configuration, a DCI 1_1 may include either new feedback indicator for scheduled group only or new feedback indicators for both scheduled and non-scheduled groups. In some embodiments, a rank indicator (RI) may be used as a new feedback indicator.

In some embodiments, the UE may decode radio resource control (RRC) signalling to configure the UE for the Type-2 HARQ-ACK codebook grouping and HARQ-ACK retransmission and report the HARQ-ACK bits according to a most recently received DCI format.

In some embodiments, when the most recently received DCI format is DCI format 1_1, the UE may report HARQ-ACK bits for HARQ-ACK retransmission by reporting HARQ-ACK bits for a current PDSCH group and one or more other PDSCH groups when indicated by the DCI format 1_1. In these embodiments, when the most recently received DCI format is not DCI format 1_1, the UE may refrain from reporting HARQ-ACK bits for HARQ-ACK retransmission. In these embodiments, if there is a DCI 1_1 in earlier time, the UE may follow the DCI 1_1 to generate the codebook. If there is no DCI 1_1, UE may feedback HARQ-ACK for all PDSCH groups scheduled by DCI 1_0 and no HARQ-ACK retransmission is supported.

In some embodiments, when the most recently received DCI format is a DCI format 1_0, the UE may report HARQ-ACK bits for a current PDSCH group without reporting HARQ-ACK bits from other PDSCH groups. When the most recently received DCI format is a DCI format 1_1, the UE may report the HARQ-ACK bits for the current PDSCH group and one or more other PDSCH groups for the HARQ-ACK retransmission when indicated by the DCI format 1_1.

In some embodiments, when there is no rank indicator (RI) indicated in the DCI format for a current PDSCH group, the UE may implement a fallback DCI format for HARQ-ACK reporting. In these embodiments, the HARQ-ACK bits are reported for all PDSCHs in the current PDSCH group which is scheduled by the DCI indicating a same slot for PUCCH resource allocation as the DCI format, without retransmitting HARQ-ACK bits from other PDSCH groups. In these embodiments, when implementing a fallback DCI format for HARQ-ACK reporting, HARQ-ACK retransmission is not supported.

In some embodiments, the new feedback indicator field indicates a number of PDSCH groups for which HARQ-ACK bits are to be reported.

In some embodiments, the DAI further includes a second T-DAI for a non-scheduled PDSCH group. In these embodiments, depending on RRC configuration, a DCI 1_1 may include either T-DAI for scheduled group only or T-DAIs for both scheduled and non-scheduled groups. In these embodiments, the UE may sort HARQ-ACK bits based on the C-DAI and derive a HARQ-ACK codebook size based on the T-DAI.

In some embodiments, for a PUCCH transmission in unlicensed spectrum (NR-U) (e.g., in an unlicensed 5 GHz band), the UE may perform a listen before talk (LBT) operation before the PUCCH transmission unless the PUCCH transmission immediately follows the PDSCH receptions. In these NR-U embodiments, the UE may not need to perform a LBT operation for an UL channel that immediately follows a DL channel if the gNB shares Channel Occupation Time (COT).

Some embodiments are directed to a fifth generation (5G) Node B (gNB). In these embodiments, the gNB may encode radio-resource control (RRC) signalling for transmission to a user equipment (UE). The RRC signalling may configure the UE for Type-2 Hybrid automatic repeat request (HARQ) acknowledge (ACK) (HARQ-ACK) codebook grouping and HARQ-ACK retransmission. In some embodiments, the gNB may encode a downlink control information (DCI) format for transmission to the UE for scheduling a physical downlink shard channel (PDSCH) group of one or more PDSCHs. In these embodiments, the DCI format may indicate the UE to multiplex HARQ-ACK bits for PDSCH receptions scheduled by the DCI format for transmission in a PUCCH transmission occasion and refrain from multiplexing HARQ-ACK bits for PDSCH receptions that are not scheduled by the DCI format. For HARQ-ACK retransmission, the DCI format may also indicate whether the UE is to include HARQ-ACK bits from more than one PDSCH group in the PUCCH transmission occasion.

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

One of the major limiting factors in wireless innovation is the availability in spectrum. To mitigate this, the unlicensed spectrum has been an area of interest to expand the availability of LTE. "In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR have been established, a natural enhancement is to allow this to also operate on unlicensed spectrum. The work to introduce shared/unlicensed spectrum in 5G NR has already been kicked off, and a new work item on "NR-Based Access to Unlicensed Spectrum" was approved in TSG RAN Meeting #82. One objective of this new WI:

HARQ operation: NR HARQ feedback mechanisms are the baseline for NR-U operation with extensions in line with agreements during the study phase (NR-U TR section 7.2.1.3.3), including immediate transmission of HARQ A/N for the corresponding data in the same shared COT as well as transmission of HARQ A/N in a subsequent COT. Potentially support mechanisms to provide multiple and/or supplemental time and/or frequency domain transmission opportunities. (RAN1)

One of the challenges in this case is that this system must maintain fair coexistence with other incumbent technologies, and in order to do so, some restriction may need to be taken into account when designing this system, depending on the particular band in which it may operate on. For instance, if operating in the 5 GHz band, a listen before talk (LBT) procedure needs to be performed to acquire the medium before a transmission can occur. For this reason, the HARQ feedback mechanism, which is tight to specific timing and operation when operating NR in licensed band must be enhanced and modified to accommodate for this constrain when performing transmission on an unlicensed band. In order to overcome this issue, this disclosure provides details on how to enhance the scheduling procedure and HARQ timing procedure of NR in order to allow for an efficient way to operate in the unlicensed spectrum.

In a NR system operating on unlicensed spectrum, since a transmission is conditional to the success of the LBT procedure, the NR HARQ feedback mechanism is no longer applicable. Motivated by this, this disclosure provides details on how to enhance the HARQ timing procedure of NR in order to allow an efficient way to operate in unlicensed spectrum.

The major advantage is that if one or more embodiments disclosed in this invention are adopted by 3GPP NR standard, it is likely that most of the vendors will implement it in their products for compliance.

In NR Rel-15, both dynamic HARQ-ACK codebook and semi-static HARQ-ACK codebook are supported. The two schemes could be enhanced by taking into account the effects of missing PUCCH transmission at UE and/or PUCCH decoding error at gNB. Consequently, the enhanced schemes can better support the operation for NR unlicensed (NR-U).

In a PUCCH transmission timing, the UE may fail to pass LBT hence there is no way to actually transmit the PUCCH carrying a set of HARQ-ACK. To avoid enforcing gNB to retransmit all the PDSCHs corresponding to the set of HARQ-ACK, it needs to support transmission of the set of HARQ-ACK at a later time.

For a PUCCH transmission from UE, due to the potential hidden nodes or other factors, it is possible gNB cannot correctly decode the PUCCH. Again, gNB has no idea the success/failure status of the related PDSCHs. To avoid enforcing gNB to retransmit all the PDSCHs corresponding to the set of HARQ-ACK, it needs to support transmission of the set of HARQ-ACK at a later time.

Dynamic HARQ-ACK Transmission

In dynamic HARQ-ACK codebook, i.e. type 2 HARQ-ACK codebook in NR Rel-15, counter downlink assignment index (C-DAI) is used to sort the HARQ-ACK bits, and total DAI (T-DAI) is used to derive the codebook size. In case a set of HARQ-ACKs fails for transmission, one issue is how to make sure gNB and UE has the same understanding on the missing of this set of HARQ-ACKs, otherwise, gNB and UE may not have same understanding a HARQ-ACK codebook size when the set of HARQ-ACKs is transmitted or retransmitted in a future time possibly together with other old or new HARQ-ACK bits. One more issue is how to deal with C-DAI and T-DAI when the set of HARQ-ACK is transmitted or retransmitted in a future time possibly together with other old or new HARQ-ACK bits.

In one embodiment, a set index is assigned to a set of PDSCHs. gNB can assign a different set index for different set of PDSCHs scheduled at a different time. For example, a set of PDSCHs have the same set index if the initial HARQ-ACK transmission of them uses the same PUCCH channel. gNB could trigger HARQ-ACK transmission for a current set of PDSCH and if needed a previous set of PDSCH. When a PDSCH is scheduled by a DCI, the DCI will include all or part of the following information, by dedicated field(s) or jointly interpreted with other information, One indication for the current set of PDSCHs, i.e. a current set index;

One indication to a previous set of PDSCH whose HARQ-ACK needs to be transmitted or retransmitted together with the current set of PDSCHs, i.e. a previous set index;

C-DAI: if above previous set index indicates a valid previous set, C-DAI will be incremented based on the last DCI of the previous set, so that C-DAI of both previous set and current set can be continuous; otherwise, C-DAI starts from value 1;

T-DAI: if above previous set index indicate a valid previous set, T-DAI will indicate the total number of DCIs until now in the previous set and the current set; otherwise, T-DAI only indicates the total number of DCIs until now in the current set;

As shown in FIG. 1A, the set of green PDSCH with C-DAI=1 and 2 with current set index=1 fails in HARQ-ACK transmission in PUCCH resource U1. After knowing this case, gNB decides to retransmit it together with a new set of PDSCH with current set index=3 by setting previous set index=1. C-DAI of the new set will be counted as 3 and 4, which follows the 2 PDSCHs from previous set 1.

In one embodiment, in a DCI scheduling a PDSCH, if there is no information on PDSCH-to-HARQ-ACK timing (K1), the current set index still indicates a valid set index. HARQ-ACK for the set of PDSCH without valid PDSCH-to-HARQ-ACK timing will be transmitted together with a set of PDSCHs with valid PDSCH-to-HARQ-ACK timing with the same current set index. PDSCH-to-HARQ-ACK timing and PUCCH resource for the HARQ-ACK transmission is indicated by the DCI scheduling a PDSCH with valid PDSCH-to-HARQ-ACK timing for the same set of PDSCHs. C-DAI and T-DAI will count PDSCHs with the same current set index continuously, possibly together with a previous set of PDSCHs which is transmitted in the previous channel Occupancy Time (COT). Within a same set of PDSCHs, a PDSCH without valid PDSCH-to-HARQ-ACK timing can be scheduled only earlier than a PDSCH with valid PDSCH-to-HARQ-ACK timing. Alternatively, within a same set of PDSCHs, a PDSCH without valid PDSCH-to-HARQ-ACK timing could be scheduled earlier than, later than or at the same timing with a PDSCH with valid PDSCH-to-HARQ-ACK timing. For example, for a UE configured with carrier aggregation, a PDSCH with valid PDSCH-to-HARQ-ACK timing is scheduled on a carrier, while another PDSCH in the same timing could be scheduled without valid PDSCH-to-HARQ-ACK timing in another carrier. FIG. 1B is showing the case that a PDSCH without valid PDSCH-to-HARQ-ACK timing is scheduled later than the PDSCH with valid PDSCH-to-HARQ-ACK timing. This case can be used when the K1 value is not applicable when the PDSCH is scheduled.

In another embodiment, a set index is assigned to a set of PDSCHs. HARQ-ACK is determined for the set of PDSCHs with same set index. The set of PDSCHs include all PDSCHs with same set index whose HARQ-ACK are not successfully transmitted yet, unless some other criteria for dropping HARQ-ACK for a PDSCH is satisfied. There could be multiple sets of PDSCHs with different set indexes, e.g. a 2-bit set index can support up to 4 set of PDSCHs, where the size of the set indexes can be configured by RRC (either by UE-specific manner or by cell-specific manner) or fixed in the specification. A set of PDSCHs may include multiple subsets of PDSCHs. Herein, a subset of PDSCHs may be allocated a PUCCH resource for the first time, or may never be assigned a PUCCH resource yet, or may be already assigned a PUCCH resource in earlier time for one or more times but failed in HARQ-ACK transmission due to LBT failure and/or gNB detection error. There could be no limitations on the time resources of the different sets of PDSCHs. The different set of PDSCHs could be mapped different time window not overlapped. The subset of PDSCHs from different set of PDSCHs could be mapped different time window not overlapped, while the subsets of PDSCHs from different set of PDSCHs could be interleaved. Alternatively, the PDSCHs from different sets of PDSCHs could be interleaved.

Preferably, a subset of a set of PDSCHs could include the PDSCHs whose HARQ-ACKs are expected to transmit on the same PUCCH resource for the first time HARQ-ACK feedback. As shown in FIG. 2, the blue PDSCHs with C-DAI equals to 1, 2, 3 could be considered as in the same subset as blue PDSCHs with C-DAI equals to 4, 5. Value 5 is indicated as value 1 if modulo 4 operation is done. Preferably, there is enough gNB processing time between a PUCCH resource for a subset and a DCI scheduling PDSCH in a followed subset. However, the exact timing between different subsets and the related PUCCHs is not limited in this disclosure and could be up to gNB implementation.

The following information could be indicated to derive the HARQ-ACKs for a set of PDSCHs to be transmitted on a currently indicated PUCCH. Herein, the currently indicated PUCCH resource could be derived by the last DCI(s) received by the UE.

One indication for a set of PDSCHs, i.e. a set index (SI), HARQ-ACK for all PDSCHs scheduled by DCI with same set index (not reset yet, i.e. reset indicator is not toggled) should be reported at currently indicated PUCCH resource.

One indication to reset the set of PDSCHs, i.e. reset indicator (RI) for the set of PDSCHs. RI can operate in a toggle or not toggle manner like new data indicator (NDI) field. Once RI is toggled, HARQ-ACK for all earlier PDSCHs with RI not toggled are omitted in HARQ-ACK transmission. That is, if a PDSCH X and all following PDSCH(s) in the set of PDSCHs are scheduled with DCIs indicating same RI as the RI for the set of PDSCHs, the reported HARQ-ACK codebook includes HARQ-ACK for the PDSCH X;

C-DAI for the set of PDSCHs: C-DAI is incremented across all DCIs with the set index if RI is not toggled. The first DCI with toggled RI will have C-DAI equal to 1;

T-DAI for the set of PDSCHs: T-DAI indicates the total number of DCIs till now across all DCIs with the set index with RI not toggled. If a UE operates on a single carrier, T-DAI may not need to be explicitly transmitted. In fact, T-DAI equals to C-DAI in this case. Therefore, C-DAI also serves the function of T-DAI.

In one embodiment A, when a PDSCH is scheduled to a UE by a DCI, only HARQ-ACKs for the current set of PDSCHs can be reported by the UE in the currently indicated PUCCH by the DCI. Herein, the SI of the current PDSCH set is included in the DCI. The DCI can include at least the following information controlling HARQ-ACK transmission, e.g. by dedicated field(s) or jointly interpreted with other information, SI for the current set of PDSCHs;
RI for the current set of PDSCHs;
C-DAI for the current set of PDSCHs;
T-DAI for the current set of PDSCHs, if present.

Alternatively, the DCI can include at least the following information controlling HARQ-ACK transmission, e.g. by dedicated field(s) or jointly interpreted with other information, SI for the current set of PDSCHs;
C-DAI for the current set of PDSCHs;

Alternatively, the DCI can include at least the following information controlling HARQ-ACK transmission, e.g. by dedicated field(s) or jointly interpreted with other information, RI for the current set of PDSCHs;
C-DAI for the current set of PDSCHs;

Alternatively, the DCI can include at least the following information controlling HARQ-ACK transmission, e.g. by dedicated field(s) or jointly interpreted with other information, C-DAI for the current set of PDSCHs;

If there is no RI indicated in the DCI, it could only apply to fallback DCI. A UE could use RI in a normal DCI indicating same SI to derive the RI for the set of PDSCH. If there is no SI indicated in the DCI, the SI could be a predefined value, e.g. the first set, or an RRC configured value.

Alternatively, with the information controlling HARQ-ACK transmission in a DCI in the above embodiment A, a UE could report HARQ-ACK for all sets of PDSCHs.

In one embodiment, if there is no RI indicated in the DCI for the current set of PDSCHs, e.g. fallback DCI, UE could include the RI derived by the last received DCI(s) scheduling PDSCH(s) of the current set to the HARQ-ACK codebook. As shown in FIG. 1C, the RI could be the first bit followed by HARQ-ACK bits. Or RI could be the last bit in UCI. Consequently, gNB could use this reported RI bit to check whether UE report the desired HARQ-ACK bits for current set. In details, if this reported RI bit is same as the latest RI of current set at gNB side, the reported HARQ-ACK bits are correct for recent PDSCHs of current set. Otherwise, gNB can interpret that UE missed all recently scheduled PDSCHs of current set and is transmitting outdated HARQ-ACK information.

Alternatively, if there is no RI indicated in the DCI for the current set of PDSCHs, e.g. fallback DCI, UE could obtain the RI indicated by the last received DCI(s) scheduling PDSCH(s) of the current set, i.e. RI,c. as shown in FIG. 1D, the UE does XOR operation between each HARQ-ACK bit and RI to form UCI payload. Then, UE report the UCI payload to gNB. At gNB side, gNB could do XOR operation between each received bit and the RI of the PDSCH set in gNB understanding, which recovers the HARQ-ACK information from UE.

Alternatively, if there is no RI indicated in the DCI for the current set of PDSCHs, e.g. fallback DCI, UE could derive RI for the current set from other information field in the DCI. For example, the RI could be obtained by PRI, e.g. RI=mod (PRI, 2). Alternatively, if there is no RI indicated in the DCI for the current set of PDSCHs, e.g. fallback DCI, the RI for the current set could be derived by the PDCCH candidate index in the search space, e.g. RI=mod(PDCCH candidate index, 2).

Alternatively, if there is no RI indicated in the DCI X for the current set of PDSCHs, e.g. fallback DCI, UE will only report HARQ-ACK bits for all PDSCHs in the current sets which are scheduled by DCI indicating the same slot for PUCCH resource allocation as the DCI X. This is exactly the same behavior as Rel-15 NR. That is, HARQ-ACK retransmission is not supported.

In one embodiment B, when a PDSCH is scheduled by a DCI, HARQ-ACK for one or multiple sets of PDSCHs are reported by UE. For a set of PDSCHs, the HARQ-ACKs are derived by the SI, RI, C-DAI and T-DAI (if present) of the set of PDSCHs. If HARQ-ACK of only one set of PDSCHs is reported, it is the current set of PDSCH. Herein, the SI of the current PDSCH set is indicated in the DCI. The DCI can include at least the following information controlling HARQ-ACK transmission, e.g. by dedicated field(s) or jointly interpreted with other information, SI for the current set of PDSCHs;

Indication for other set(s) of PDSCHs to be reported together with current set of PDSCH.

RI for the current set of PDSCHs;

C-DAI for the current set of PDSCHs;

T-DAI for the current set of PDSCHs, if present.

Alternatively, the DCI can include at least the following information controlling HARQ-ACK transmission, e.g. by dedicated field(s) or jointly interpreted with other information, SI for the current set of PDSCHs;

Indication for other set(s) of PDSCHs to be reported together with current set of PDSCHs;

RI for each set of PDSCHs whose HARQ-ACKs are to be reported on the currently indicated PUCCH. The number of RI equals to maximum number of sets of PDSCHs. Alternatively, the number of RI equals to maximum number of sets of PDSCHs whose HARQ-ACK could be reported in a same PUCCH, e.g. UE is configured to report HARQ-ACK for at most 2 of 4 sets of PDSCHs.

C-DAI for the current set of PDSCHs.

T-DAI for the current set of PDSCHs, if present.

Alternatively, the DCI can include at least the following information controlling HARQ-ACK transmission, e.g. by dedicated field(s) or jointly interpreted with other information, SI for the current set of PDSCHs.

Indication for other set(s) of PDSCHs to be reported together with current set of PDSCHs;

RI for each set of PDSCHs whose HARQ-ACKs are to be reported on the currently indicated PUCCH. The number of RI equals to maximum number of sets of PDSCHs. Alternatively, the number of RI equals to maximum number of sets of PDSCHs whose HARQ-ACK could be reported in a same PUCCH, e.g. UE is configured to report HARQ-ACK for at most 2 of 4 sets of PDSCHs.

C-DAI for the current set of PDSCHs.

T-DAI for each set of PDSCHs whose HARQ-ACKs are to be reported on the currently indicated PUCCH, if present. The number of T-DAI equals to maximum number of sets of PDSCHs. Alternatively, the number of T-DAI equals to maximum number of sets of PDSCHs whose HARQ-ACK could be reported in a same PUCCH, e.g. UE is configured to report HARQ-ACK for at most 2 of 4 sets of PDSCHs.

Regarding indication for other set(s) of PDSCHs to be reported together with current set of PDSCH, it could be indicated using a bitmap with 1-by-1 mapping for the other set(s) of PDSCHs. if maximum N sets of PDSCHs could be used in PDSCH scheduling, the indication could use N−1 bits. If maximum 2 sets of PDSCHs could be used in PDSCH scheduling, the indication could be one bit to indicate whether the other set different from the current set is to be reported. Alternatively, the indication could be number of other sets to be reported. If it indicates zero, it is to only report for the current set. If it indicates one, it is to report for both sets. Alternatively, the indication could be number of sets to be reported. If it indicates one set, it is to only report for the current set. If it indicates two sets, it is to report for both sets.

Alternatively, the DCI can include at least the following information controlling HARQ-ACK transmission, e.g. by dedicated field(s) or jointly interpreted with other information, SI for the current set of PDSCHs;

RI for each set of PDSCHs. The number of RI equals to maximum number of sets of PDSCHs.

C-DAI for the current set of PDSCHs.

T-DAI for the current set of PDSCHs, if present.

Alternatively, the DCI can include at least the following information controlling HARQ-ACK transmission, e.g. by dedicated field(s) or jointly interpreted with other information, SI for the current set of PDSCHs;

RI for each set of PDSCHs. The number of RI equals to maximum number of sets of PDSCHs.

C-DAI for the current set of PDSCHs.

T-DAI for each set of PDSCHs, if present. The number of T-DAI equals to maximum number of sets of PDSCHs.

Regarding RI for each set of PDSCHs, if HARQ-ACK needs to be reported for a set of PDSCHs, the indicated RI for the set is same as RI in the latest DCI(s) scheduling PDSCH in the set, i.e. not toggled. if HARQ-ACK doesn't need to be reported for a set of PDSCH, the indicated RI for the set is toggled compared to the RI in the latest DCI(s) scheduling PDSCH in the set.

In embodiment B triggering HARQ-ACK transmission for one or multiple sets of PDSCHs by a DCI, for a set Y of PDSCHs other than the current set of PDSCHs if HARQ-ACK transmission for set Y is triggered, if there is no RI for set Y indicated in the DCI, RI for set Y can be derived by the last received DCI(s) scheduling PDSCH of the set Y.

if there is no T-DAI for set Y indicated in the DCI, T-DAI for set Y can be derived by the last received DCI(s) scheduling PDSCH of the set Y.

In one embodiment, if HARQ-ACK for multiple sets of PDSCHs are triggered by a DCI, for a set Y of PDSCHs other than the current set of PDSCHs, if there is no RI for set Y indicated in the DCI, UE could append the RI for set Y derived by the last received DCI(s) scheduling PDSCH of the set Y to the HARQ-ACK codebook. As shown in FIG. 1E, the RI could be the first bit followed by HARQ-ACK bits of both groups. Or RI could be positioned before corresponding HARQ-ACK bits inside UCI. Or RI could be positioned after corresponding HARQ-ACK bits inside UCI. Or the RI could be the last bit followed by HARQ-ACK bits of both groups. Consequently, gNB could use this reported RI bit to check whether UE report the desired HARQ-ACK bits for set Y. In details, if this reported RI bit is same as the latest RI of set Y at gNB side, the reported HARQ-ACK bits are correct for recent PDSCHs of set Y. Otherwise, gNB can interpret UE missed all recently scheduled PDSCHs of set Y and is transmitting outdated HARQ-ACK information.

Alternatively, if there is no RI for set Y indicated in the DCI, UE obtains the RI for set Y derived by the last received DCI(s) scheduling PDSCH of the set Y, i.e. RI. The UE does XOR operation between each HARQ-ACK bit of set Y and RI to form UCI payload. Then, UE report the UCI payload to gNB. As shown in FIG. 1F, assuming set 0 has an indicated RI by the DCI while set 1 not, HARQ-ACK bits for set 0 are transmitted as is, while XOR operation is done between each HARQ-ACK bit for set 1 and the RI for set 1 ($RI_1$). At gNB side, gNB could do XOR operation between each received bit for set Y and the RI of set Y in gNB understanding, which recovers the HARQ-ACK information for set Y from UE.

Alternatively, UE could derive RI for each set. If RI is indicated for a set in the DCI, the indicated RI is used. Otherwise, UE obtains the RI for set Y derived by the last received DCI(s) scheduling PDSCH of the set Y. For each set, the UE does XOR operation between each HARQ-ACK bit of the set and the RI for the set to form UCI payload. Then, UE report the UCI payload to gNB. As shown in FIG. 1G, XOR operation is done between each HARQ-ACK bit for set 0 and the RI for set 0 ($RI_0$), while, XOR operation is done between each HARQ-ACK bit for set 1 and the RI for set 1 ($RI_1$). At gNB side, for each set, gNB could do XOR operation between each received bit for the set and the RI of the set in gNB understanding, which recovers the HARQ-ACK information for the set from UE. By this alternative, wrong XOR operation for a set is avoided even when there is potential confusion on which set is the last scheduled set between gNB and UE.

Alternatively, if there is no RI for set Y indicated in the DCI, UE could derive RI for set Y from other information field in the DCI. For example, the RI could be obtained by PRI, RI=mod(PRI, 2). Alternatively, if there is no RI indicated in the DCI for set Y, the RI for set Y could be derived by the PDCCH candidate index in the search space.

In one embodiment, in case HARQ-ACK for multiple sets of PDSCHs are reported by UE, HARQ-ACKs for the multiple sets of PDSCHs are sorted in an increasing order or decreasing order of set index.

Alternatively, in case HARQ-ACK for multiple sets of PDSCHs are reported by UE, HARQ-ACKs for the current set of PDSCHs are sorted first, followed by the HARQ-ACKs for the other set(s) of PDSCHs in an increasing order or decreasing order of set index.

A UE may need to monitor a normal DL DCI and a fallback DL DCI for the PDSCH scheduling. Herein, a normal DL DCI is the DCI which provides more flexible control on the PDSCH transmission for larger throughput. A normal DCI could have a larger payload size, e.g. DCI 1_1 in NR Rel-15. On the other hand, a fallback DCI is targeted for reliable transmission of PDCCH and PDSCH. A fallback DCI could have a smaller payload size for better link performance, e.g. DCI 1_0 in NR Rel-15. According to above analysis, small payload size of DCI 1_0 helps to improve link performance of DCI 1_0. One way to reduce the size of fallback DCI is to reduce the information controlling HARQ-ACK transmission.

In one embodiment, for a fallback DCI, e.g. DCI 1_0, only HARQ-ACKs for the current set of PDSCHs are reported by UE. For a fallback DCI, only information controlling HARQ-ACK transmission for a current set of PDSCHs is indicated, as provided in above embodiment A. While, for a normal DCI, e.g. DCI 1_1, HARQ-ACK for one or multiple sets of PDSCHs are reported by UE. For a normal DCI, information controlling HARQ-ACK transmission for one or multiple sets of PDSCHs are indicated, as provided in above embodiment B.

In one embodiment, for a normal DCI, e.g. DCI 1_1, HARQ-ACK for one or multiple sets of PDSCHs are reported by UE. For a normal DCI, information controlling HARQ-ACK transmission for one or multiple sets of PDSCHs are indicated, as provided in above embodiment B. While, for a fallback DCI, e.g. DCI 1_0, HARQ-ACK for all sets of PDSCHs are reported by UE. For a fallback DCI, only information controlling HARQ-ACK transmission for a current set of PDSCHs is indicated, as provided in above embodiment A. Alternatively, a fallback DCI includes at least the following information controlling HARQ-ACK transmission, e.g. by dedicated field(s) or jointly interpreted with other information, SI for the current set of PDSCHs;
RI for each set of PDSCHs. The number of RI equals to maximum number of sets of PDSCHs.
C-DAI for the current set of PDSCHs;

In one embodiment, a UE determines the set(s) of PDSCHs for which HARQ-ACKs are reported according to information in the last received DCI(s). If the last DCI is DCI 1_0, the UE could only report HARQ-ACK for the current set, e.g. set 0, no matter DCI 1_1 is received or not. Alternatively, if the last DCI is DCI 1_0, the UE could determine the set(s) of PDSCHs for which HARQ-ACKs are reported according to a most recent DCI 1_1 scheduling PDSCHs. The DCI 1_1 could schedule a PDSCH of the current set of PDSCHs. Alternatively, if HARQ-ACK feedback of multiple sets of PDSCHs are triggered, the DCI 1_1 could schedule a PDSCH of one of the multiple sets of PDSCHs. If all DCIs received by UE are DCI 1_0, UE could report the HARQ-ACKs following the indication in DCI 1_0.

In one embodiment, the same information controlling HARQ-ACK transmission (only for a current set of PDSCHs as embodiment A, or for one or multiple sets of PDSCHs as embodiment B) is included in a normal DCI and a fallback DCI.

As shown in FIG. 2, the green PDSCHs with C-DAI=1 and 2 with set index=1 with reset indicator=0 fails in HARQ-ACK transmission in PUCCH resource U1. After knowing this case, gNB decides to retransmit it together with HARQ-ACK for dark red PDSCHs, the same set index=1 is assigned for the dark red PDSCHs with reset indicator=0 (i.e. not toggled). In this case, C-DAI of the dark red PDSCHs will be counted as 3 and 4 which follows the two green PDSCHs with set index 1. By this way, HARQ-ACK transmission in PUCCH resource U3 include HARQ-ACK for all 4 PDSCHs.

On the other hand, as shown in FIG. 3A, if gNB receives the HARQ-ACK for the green PDSCHs with set index 1 and gNB still wants to use set index 1, gNB could indicate set index=1 with reset indicator=1 (i.e. toggled) for the dark red PDSCHs. In this case, C-DAI of the dark red PDSCHs will be counted as 1 and 2, i.e. C-DAI counting is restarted. By this way, HARQ-ACK transmission in PUCCH resource U3 only includes HARQ-ACK for two dark red PDSCHs.

In one embodiment, as shown in FIG. 2 and FIG. 3A, in a DCI scheduling a PDSCH, if there is no information on PDSCH-to-HARQ-ACK timing, e.g. a non-numerical value for K1 is indicated in the DCI, the set index still indicates a valid set index. HARQ-ACK for a PDSCH without valid PDSCH-to-HARQ-ACK timing, e.g. scheduled by a DCI indicating non-numerical value for K1, could be transmitted together with PDSCH(s) scheduled by DCI(s) with valid PDSCH-to-HARQ-ACK timing. PDSCH-to-HARQ-ACK timing and PUCCH resource for the HARQ-ACK transmission is indicated by the DCI scheduling a PDSCH with valid PDSCH-to-HARQ-ACK timing. C-DAI and T-DAI will count PDSCHs with the same set index continuously.

The PDSCH-to-HARQ-ACK timing and PUCCH resource for a PDSCH scheduled without valid PDSCH-to-HARQ-ACK timing and with a set index can be derived by a non-earlier DCI scheduling PDSCH with valid PDSCH-to-HARQ-ACK timing and triggering HARQ-ACK feedback for at least the set of PDSCHs with the same set index. Herein, the non-earlier DCI could be transmitted at a timing of PDCCH monitoring occasion which is the same as or later than the DCI scheduling the PDSCH scheduled without valid PDSCH-to-HARQ-ACK timing. For a UE configured with carrier aggregation, a PDSCH with valid PDSCH-to-HARQ-ACK timing is scheduled on a carrier, while another PDSCH in the same timing could be scheduled without valid PDSCH-to-HARQ-ACK timing in another carrier. The non-earlier DCI, if locating at the same timing of PDCCH monitoring occasion, could be ordered before or after the DCI without valid PDSCH-to-HARQ-ACK timing. If the non-earlier DCI indicates a value of reset indicator for the set of PDSCH with same set index, the value must be not toggled compared with the reset indicator in the DCI scheduling the PDSCH without valid PDSCH-to-HARQ-ACK timing. If the non-earlier DCI doesn't indicate a value of reset indicator for the set of PDSCH with same set index, there does not exist any other DCI scheduling PDSCH with the same set index but with a toggled reset indicator compared with the DCI scheduling the PDSCH without valid PDSCH-to-HARQ-ACK timing, between the non-earlier DCI and the DCI scheduling the PDSCH without valid PDSCH-to-HARQ-ACK timing. As shown in FIG. 3B, 12 PDSCHs are scheduled with same set index and same value of reset indicator assuming 3 serving cells are configured via carrier aggregation. The last two DCIs indicating (C-DAI, T-CAI) of (11, 12) and (12, 12) do not indicate valid PDSCH-to-HARQ-ACK timing and PUCCH resource. In this case, UE could derive the PDSCH-to-HARQ-ACK timing and PUCCH resource based on the $3^{rd}$ last DCI indicating (10, 12). Though the $3^{rd}$ last DCI is ordered earlier than the last two DCIs, the three DCIs are transmitted in the same timing. Consequently, the same T-DAI is carried in all three DCIs. The correct HARQ-ACK codebook size can be derived by the T-DAI in the $3^{rd}$ last DCI.

Further, the DCI scheduling PDSCH with valid PDSCH-to-HARQ-ACK timing could even be transmitted earlier than the DCI scheduling PDSCH without valid PDSCH-to-HARQ-ACK timing. That is, the PDSCH-to-HARQ-ACK timing and PUCCH resource for a PDSCH scheduled without valid PDSCH-to-HARQ-ACK timing and with a set index could be derived by any DCI scheduling PDSCH with valid PDSCH-to-HARQ-ACK timing and triggering HARQ-ACK feedback for at least the set of PDSCHs with the same set index. Herein, the above-mentioned any DCI could be transmitted at a timing of PDCCH monitoring occasion which is earlier than, the same as or later than the DCI scheduling the PDSCH without valid PDSCH-to-HARQ-ACK timing. Alternatively, if the above-mentioned any DCI is transmitted at an earlier timing than or the same timing as the DCI scheduling the PDSCH without valid PDSCH-to-HARQ-ACK timing, one more restriction is that the above-mentioned any DCI must indicate the same value of T-DAI as the DCI scheduling the PDSCH scheduled without valid PDSCH-to-HARQ-ACK timing. If the above-mentioned any DCI indicates a value of reset indicator for the set of PDSCH with same set index, the value must be not toggled compared with the reset indicator in the DCI scheduling the PDSCH without valid PDSCH-to-HARQ-ACK timing. If the above-mentioned any DCI doesn't indicate a value of reset indicator for the set of PDSCH with same set index, there should not exist any other DCI scheduling PDSCH with the same set index but with a toggled reset indicator compared with the DCI scheduling the PDSCH without valid PDSCH-to-HARQ-ACK timing, between the above-mentioned any DCI and the DCI scheduling the PDSCH without valid PDSCH-to-HARQ-ACK timing. FIG. 1B is showing the case that a PDSCH without valid PDSCH-to-HARQ-ACK timing is scheduled later than the PDSCH with valid PDSCH-to-HARQ-ACK timing. The PDSCH-to-HARQ-ACK timing and PUCCH resource is derived by the earlier DCI scheduling PDSCH without valid PDSCH-to-HARQ-ACK timing. This case can be used when the K1 value is not applicable when the PDSCH is scheduled. In one embodiment, for a single serving cell case without carrier aggregation, the HARQ-ACK timing of the PDSCH #1 scheduled by DCI with non-numerical value can be derived from the K1 value of the DCI scheduling the PDSCH #2 with the same set index, which is later than PDSCH #1. Alternatively, if multiple DCIs can be transmitted in the same PDCCH monitoring occasion for the scheduling of multiple PDSCHs on the cell, the HARQ-ACK timing of the PDSCH #1 scheduled by DCI with non-numerical value can be derived from the K1 value of the DCI scheduling the PDSCH #2 with the same set index, which is same timing with PDSCH #1 or later than PDSCH #1. However, for a multi-serving cell case with carrier aggregation, the HARQ-ACK timing of the PDSCH #1 scheduled by DCI with non-numerical value can be derived from the K1 value of the DCI scheduling the PDSCH #2 with the same set index, which is same timing with PDSCH #1 or later than PDSCH #1.

When a PDSCH is scheduled by a DCI, it could also support triggering one-shot HARQ-ACK feedback for all HARQ processes. One-shot HARQ-ACK feedback has the benefit of fixed codebook size hence is more robust. For example, a dedicated bit in a DCI could indicate either a normal dynamic HARQ-ACK feedback or a one-shot HARQ-ACK feedback. Alternatively, a combination of certain values of multiple fields in a DCI may indicate one-shot HARQ-ACK feedback; otherwise it is normal dynamic HARQ-ACK feedback.

In one embodiment C, when a PDSCH is scheduled by a DCI, if one-shot HARQ-ACK feedback is indicated, the DCI could include at least the following information controlling HARQ-ACK transmission, e.g. by dedicated field(s) or jointly interpreted with other information, SI for the current set of PDSCHs;
RI for the current set of PDSCHs;
RI for the other set(s) of PDSCHs;
C-DAI for the current set of PDSCHs.
T-DAI for the current set of PDSCHs, if present.
Equivalently, the DCI could include,
SI for the current set of PDSCHs;
RI for each set of PDSCHs.
C-DAI for the current set of PDSCHs.
T-DAI for the current set of PDSCHs, if present.

A UE will form a HARQ-ACK codebook which includes HARQ-ACK for all the HARQ processes. If the RI of a latest PDSCH associated with a HARQ process is not toggled compared to the RI in the triggering DCI for the set of PDSCHs which includes the latest PDSCH of the same HARQ process, the UE retransmits the actual HARQ-ACK for the HARQ process. If the RI of a latest PDSCH associated with a HARQ process is toggled compared to the RI in the triggering DCI for the same set of PDSCHs which includes the latest PDSCH of the same HARQ process, the UE transmits NACK/DTX for the HARQ process. For all other HARQ processes, the UE transmits NACK/DTX.

In the DCI, C-DAI/T-DAI may not be useful in the current one-shot HARQ-ACK feedback, however, it is still beneficial to transmit such information. For example, if the one-shot HARQ-ACK transmission from UE fails due to either UL LBT failure or wrong detection at gNB side, it is up to gNB implementation to trigger a normal dynamic HARQ-ACK feedback or another one-shot HARQ-ACK feedback in a future time.

Certain fields in DCI could be interpreted based on normal dynamic HARQ-ACK feedback or one-shot HARQ-ACK feedback is indicated. The common fields in a DCI in embodiment B and C are not reinterpreted.

The common fields can include
indication on normal dynamic HARQ-ACK feedback or one-shot HARQ-ACK feedback.
SI for the current set of PDSCHs.
C-DAI for the current set of PDSCHs.
T-DAI for the current set of PDSCHs, if present.

If a DCI is triggering normal dynamic HARQ-ACK feedback, the following information can be signaled: Indication for other set(s) of PDSCHs to be reported together with current set of PDSCH' and 'RI for the current set of PDSCHs'. While, if DCI is triggering one-shot HARQ-ACK feedback, 'RI for each set of PDSCHs' can be signaled.

Alternatively, the common fields can include
indication on normal dynamic HARQ-ACK feedback or one-shot HARQ-ACK feedback.
SI for the current set of PDSCHs.
RI for the current set of PDSCHs.
C-DAI for the current set of PDSCHs.
T-DAI for the current set of PDSCHs, if present.

If a DCI is triggering normal dynamic HARQ-ACK feedback, 'Indication for other set(s) of PDSCHs to be reported together with current set of PDSCH' can be signaled. While, if DCI is triggering one-shot HARQ-ACK feedback, 'RI for other set(s) of PDSCHs except the current set of PDSCHs' can be signaled. Specifically, if only two sets are used, a DCI indicates one-bit Indication for the other set of PDSCHs if it is triggering normal dynamic HARQ-ACK feedback. While, it indicates one-bit RI for the other set of PDSCHs if DCI is triggering one-shot HARQ-ACK feedback.

In one embodiment, the above one-shot HARQ-ACK feedback could be triggered by both normal DCI and fallback DCI. alternatively, the above one-shot HARQ-ACK feedback could be triggered by normal DCI only. By this way, one bit is saved in fallback DCI for better link performance. Alternatively, a fallback DCI always triggers one-shot HARQ-ACK feedback, while a normal DCI can indicate either a one-shot HARQ-ACK feedback or a normal dynamic HARQ-ACK feedback.

When a PUSCH is scheduled by a DCI, it could also support triggering one-shot HARQ-ACK feedback for all HARQ processes on PUSCH. For example, a dedicated bit in the DCI could indicate one-shot HARQ-ACK feedback on the scheduled PUSCH. Alternatively, a combination of certain values of multiple fields in the DCI may indicate one-shot HARQ-ACK feedback on the scheduled PUSCH.

In one embodiment, when a PUSCH is scheduled to a UE by a DCI, if one-shot HARQ-ACK feedback is indicated, HARQ-ACKs for all the HARQ processes can be reported by the UE. Otherwise, the UE transmits HARQ-ACKs on PUSCH only if the PUSCH is overlapped with a PUCCH for HARQ-ACK. In addition to the indication triggering one-shot HARQ-ACK feedback, the DCI could include at least the following information controlling HARQ-ACK transmission, e.g. by dedicated field(s) or jointly interpreted with other information,
RI for the current set of PDSCHs;
RI for the other set(s) of PDSCHs;
Equivalently, the DCI could include,
RI for each set of PDSCHs.

A UE will form a HARQ-ACK codebook which includes HARQ-ACK for all the HARQ processes. If the RI of a latest PDSCH associated with a HARQ process is not toggled compared to the RI in the triggering DCI for the set of PDSCHs which includes the latest PDSCH of the same HARQ process, the UE retransmits the actual HARQ-ACK for the HARQ process. If the RI of a latest PDSCH associated with a HARQ process is toggled compared to the RI in the triggering DCI for the same set of PDSCHs which includes the latest PDSCH of the same HARQ process, the UE transmits NACK/DTX for the HARQ process. For all other HARQ processes, the UE transmits NACK/DTX.

If one-shot HARQ-ACK feedback is not indicated in the DCI which schedules a PUSCH, and if the PUSCH is overlapped with a PUCCH for HARQ-ACK, the DCI could include the following information to derive the size of normal dynamic codebook, e.g. as NR Rel-15.

T-DAI for the dynamic HARQ-ACK codebook if CBG based PDSCH transmission is not configured, or for the first HARQ-ACK sub-codebook if CBG based PDSCH transmission is configured;

T-DAI for the second HARQ-ACK sub-codebook if CBG based PDSCH transmission is configured.

Certain field(s) in DCI which schedules a PUSCH could be differently interpreted based on whether normal dynamic HARQ-ACK feedback or one-shot HARQ-ACK feedback is indicated. If the DCI indicates normal dynamic HARQ-ACK feedback, it is interpreted as T-DAI. If the DCI indicates one-shot HARQ-ACK feedback, it is interpreted as 'RI for the current set of PDSCHs' and 'RI for the other set(s) of PDSCHs', or as 'RI for each set of PDSCHs'.

In one embodiment, when a PUSCH is scheduled by a DCI, HARQ-ACK transmission on PUSCH is triggered if the PUSCH is overlapped with a PUCCH for HARQ-ACK transmission. If one-shot HARQ-ACK feedback is indicated by the DCI, HARQ-ACKs for all HARQ processes are transmitted on PUSCH. Otherwise, HARQ-ACKs with normal dynamic codebook are transmitted on PUSCH.

In one embodiment, when a PUSCH is scheduled by a DCI, HARQ-ACK transmission on PUSCH is triggered by the DCI, no matter the PUSCH is overlapped with a PUCCH for HARQ-ACK transmission or not.

If indicated by the DCI, HARQ-ACK for one set of PDSCHs are reported by UE. The DCI could include at least the following information controlling HARQ-ACK transmission, e.g. by dedicated field(s) or jointly interpreted with other information,
SI for a set of PDSCHs;
RI for the set of PDSCHs;
T-DAI for the set of PDSCHs.

Alternatively, the DCI may include at least the following information controlling HARQ-ACK transmission, e.g. by dedicated field(s) or jointly interpreted with other information,
SI for a set of PDSCHs;
T-DAI for the set of PDSCHs.

If indicated by the DCI, HARQ-ACK for one or multiple sets of PDSCHs are reported by UE. The DCI could include at least the following information controlling HARQ-ACK transmission, e.g. by dedicated field(s) or jointly interpreted with other information,
SI for a first set of PDSCHs whose HARQ-ACKs are to be reported.
Indication for other set(s) of PDSCHs whose HARQ-ACKs are to be reported;
RI for the first set of PDSCHs.
T-DAI for the first set of PDSCHs.

Alternatively, the DCI will include at least the following information controlling HARQ-ACK transmission, e.g. by dedicated field(s) or jointly interpreted with other information, SI for a first set of PDSCHs whose HARQ-ACKs are to be reported.

Indication for other set(s) of PDSCHs whose HARQ-ACKs are to be reported;

RI for each set of PDSCHs whose HARQ-ACKs are to be reported.

T-DAI for the first set of PDSCHs.

Alternatively, the DCI will include at least the following information controlling HARQ-ACK transmission, e.g. by dedicated field(s) or jointly interpreted with other information, Indication for the set(s) of PDSCHs whose HARQ-ACKs are to be reported.

RI for each set of PDSCHs whose HARQ-ACKs are to be reported

T-DAI for each set of PDSCHs whose HARQ-ACKs are to be reported.

Alternatively, the DCI will include at least the following information controlling HARQ-ACK transmission, e.g. by dedicated field(s) or jointly interpreted with other information, SI for a first set of PDSCHs;

RI for each set of PDSCHs. The number of RI equals to maximum number of sets of PDSCHs.

T-DAI for the first set of PDSCHs.

Alternatively, the DCI will include at least the following information controlling HARQ-ACK transmission, e.g. by dedicated field(s) or jointly interpreted with other information, RI for each set of PDSCHs. The number of RI equals to maximum number of sets of PDSCHs.

T-DAI for each set of PDSCHs. The number of T-DAI equals to maximum number of sets of PDSCHs.

In one embodiment, when a PUSCH is scheduled by a DCI, HARQ-ACK transmission on PUSCH is triggered if the PUSCH is overlapped with a PUCCH for HARQ-ACK transmission. If HARQ-ACK for single set of PDSCHs is triggered on PUCCH, UE generates a HARQ-ACK codebook following the normal dynamic HARQ-ACK codebook generation. T-DAI and/or reset indicator for the single set of PDSCH could be indicated by the UL grant. Otherwise, UE generates one-shot HARQ-ACK feedback, i.e. HARQ-ACKs for all HARQ processes are transmitted on PUSCH. In this case, T-DAI and/or reset indicator in the UL grant are reused to indicate reset indicators of the multiple or all sets of PDSCHs.

In one embodiment, when a PUSCH is scheduled to a UE by a DCI, if one-shot HARQ-ACK feedback is indicated, HARQ-ACKs for all the HARQ processes can be reported by the UE. Otherwise, the UE transmits HARQ-ACKs on PUSCH only if the PUSCH is overlapped with a PUCCH for HARQ-ACK. If HARQ-ACK for single set of PDSCHs is triggered on PUCCH, UE generates a HARQ-ACK codebook following the normal dynamic HARQ-ACK codebook generation. T-DAI and/or reset indicator for the single set of PDSCH could be indicated by the UL grant. Otherwise, UE generates one-shot HARQ-ACK feedback, i.e. HARQ-ACKs for all HARQ processes are transmitted on PUSCH. In this case, T-DAI and/or reset indicator in the UL grant are reused to indicate reset indicators of the multiple or all sets of PDSCHs.

In one embodiment, the above one-shot HARQ-ACK feedback could be triggered by both normal DCI and fallback DCI. alternatively, the above one-shot HARQ-ACK feedback could be triggered by normal DCI only. By this way, one bit is saved in fallback DCI for better link performance.

In one embodiment, assuming a DCI could indicate one or multiple values of K1 for PDSCH-to-HARQ-ACK timings, the HARQ-ACK codebook could still be determined by set index, reset indicator, C-DAI/T-DAI. As shown in FIG. 8, the green PDSCHs with C-DAI=1 and 2 with set index=1 with reset indicator=0 fails in HARQ-ACK transmission in PUCCH resource U1. After knowing this case, gNB decides to retransmit it together with HARQ-ACK for two blue PDSCHs, the same set index=1 is assigned for the blue PDSCHs with reset indicator=0 (i.e. not toggled). C-DAI of the blue PDSCHs will be counted as 3 and 4 which follows the two green PDSCHs with set index 1. By this way, HARQ-ACK transmission in PUCCH resource U2 or U3 includes HARQ-ACK for 4 PDSCHs. However, though gNB provides two opportunities for LBT operation of PUCCH, it is still possible that LBT could be failed or gNB doesn't receive the PUCCH. In this case, gNB decides to retransmit HARQ-ACK for all 4 PDSCHs together with HARQ-ACK for dark red PDSCHs, the same set index=1 is assigned for the dark red PDSCHs with reset indicator=0 (i.e. not toggled). In this case, C-DAI of the dark red PDSCHs will be counted as 5 and 6 which follows the blue PDSCHs with set index 1. Value 5 and 6 are indicated as value 1 and 2 if modulo 4 operation is done. By this way, HARQ-ACK transmission in PUCCH resource U4 or U5 includes HARQ-ACK for all 6 PDSCHs.

In one embodiment, when gNB schedules a PDSCH by a DCI, gNB may want to trigger transmission or retransmission of HARQ-ACK for earlier PDSCHs without HARQ-ACK for current PDSCHs. A separated bit can be included in DCI to indicate such operation. If this separated bit is set, it is to report the HARQ-ACK for earlier PDSCHs only. K1 indicates a PDSCH-to-HARQ-ACK timing related to the currently scheduled PDSCH and ARI indicates a PUCCH resource. The derived PUCCH resource by K1 and ARI is actually used for the HARQ-ACK transmission of earlier PDSCHs only. TPC, set index, and restart indication are determined as is. T-DAI can be reinterpreted as an indicator of set index of a set of earlier PDSCHs for which the HARQ-ACK is triggered; however, C-DAI is still used as counter for HARQ-ACK ordering of current PDSCH(s). Preferably, the indicated set index by T-DAI is different from the set index in the DCI. That is, the DCI is triggering HARQ-ACK transmission for a set of PDSCHs with a different set index from the current scheduled PDSCH. Otherwise, it may cause confusion on how to interpret the reset indicator. If this separated bit is not set. HARQ-ACK for earlier PDSCHs, if existed, are transmitted together with currently scheduled PDSCH as disclosed in other embodiments.

Preferably, a subset of a set of PDSCHs could include the PDSCHs whose HARQ-ACKs are expected to transmit on the same PUCCH resource for the first time HARQ-ACK feedback. As shown in FIG. 9, 10, 18, 19, 20 or 21, 2 green PDSCHs belong to a first subset, while 4 blue PDSCHs belong to a second subset. For consecutive subsets, there may be not enough gNB processing time between a PUCCH resource for the first subset(s) and one or more DCIs scheduling PDSCHs in the second subset. The first subset(s) may be strictly a single subset of the set of PDSCHs, or the first subset(s) could be actually multiple consecutive subsets having the same value of reset indicator. The value of reset indicator in the above mentioned one or more DCIs could be different from the value of reset indicator in the other DCIs of the second subset. Reset indicator in the other DCIs of the second subset is used to determine HARQ-ACK transmission of all PDSCHs in the second subset. If no DCI in the $2^{nd}$ subset other than the above mentioned one or more DCIs is received, reset indicator in the above mentioned one or more DCIs is used to determine HARQ-ACK transmission of the second subset. Alternatively, reset indictor in a later DCI scheduling the set of PDSCHs is used to derive the effective reset indicator of the second subset.

In the above mentioned one or more DCIs, since gNB doesn't know whether HARQ-ACK of PDSCHs in the first subset(s) can be received or not due to insufficient processing time, gNB could keep reset indicator unchanged. Alternatively, gNB and UE may just neglect the value of reset indicator in the above mentioned one or more DCIs. According to a DCI in the $2^{nd}$ subset other than the above mentioned one or more DCIs, if the reset indicator is not toggled, HARQ-ACK for all the above consecutive subsets are transmitted. Otherwise, if the reset indicator is toggled, only HARQ-ACK for all PDSCHs in the second subset is reported. If no DCI in the $2^{nd}$ subset other than the above mentioned one or more DCIs is received, UE could skip HARQ-ACK transmission, or UE could report HARQ-ACK for PDSCHs in the first subset(s) and also for PDSCHs scheduled by the above mentioned one or more DCIs in a PUCCH indicated by a DCI of the second subset. If no DCI in the $2^{nd}$ subset other than the above mentioned one or more DCIs is received, assuming UE doesn't transmit PUCCH carrying HARQ-ACK, an additional DCI must trigger HARQ-ACK retransmission by scheduling the same set of PDSCHs at a later time. That is, reset indicator of the later DCI equals to the effective reset indicator of the second subset, and also determine whether to retransmit HARQ-ACK for PDSCHs in the first subset(s).

In one embodiment, for the above consecutive subsets, two different indications of C-DAI/T-DAI could be indicated at least in the above mentioned one or more DCIs. The above two indications of C-DAI/T-DAI can be explicitly included as separate fields in a DCI. Alternatively, one indication of C-DAI/T-DAI (indication A) is included as a field in a DCI, while the other indication of C-DAI/T-DAI (indication B) is only indicated in the above mentioned one or more DCIs by reinterpreting other existing field(s), for example, TPC or RAI. In all the above consecutive subsets, at least one C-DAI/T-DAI is indicated. In the DCIs which are not the above mentioned one or more DCIs, there is just one-DAI/T-DAI is indicated. For those DCI, gNB may indicate indication A or indication B depending on the HARQ-feedback situation. The gNB may toggle the reset indicator to indicate if indication B is included, while indication A is included otherwise. From a UE perspective, depending on whether reset indicator is toggled or not, the UE may know which indication is received between indication A and indication B. Indication A of C-DAI/T-DAI counts number of PDSCHs in all the above consecutive subsets, still denoted as C-DAI/T-DAI in the following. Indication B of C-DAI/T-DAI only counts the number of PDSCHs in the second subset, denoted V-C-DAI/V-T-DAI.

In the above mentioned one or more DCIs, gNB could set a special value of K1, i.e. no valid PDSCH-to-HARQ-ACK-timing indicated, so that ARI and/or TPC can be reinterpreted to indicate V-C-DAI/V-T-DAI. As shown in FIG. 9 or 10, the first two blue PDSCHs are next to PUCCH U1, gNB cannot prepare scheduling information in these two DCIs considering HARQ-ACK information carried in U1 due to the insufficient processing time. In these two DCIs, C-DAI=3 & 4 are indicated following the two green PDSCHs with C-DAI=1 & 2. Additionally, V-C-DAI=1 & 2 are indicated in DCI, where ARI or TPC fields are not needed so that V-C-DAI can be indicated instead of AIR or TPC without changing the total number of bits for DCI. Reset indicator are unchanged (i.e. value 0, not toggled). Starting from the $3^{rd}$ blue PDSCH, gNB could know the reception status of U1 due to the sufficient processing time for U1 decoding. The interpretation as C-DAI or V-C-DAI for the DCIs scheduling the last two blue PDSCHs depends on whether reset indicator is toggled or not.

In FIG. 9, U1 is not received, gNB could trigger UE to report HARQ-ACK for PDSCH with C-DAI=1 & 2 again, so gNB keeps same value of reset indicator (i.e. value 0, not toggled) and indicates C-DAI=5 & 6 (1 & 2 after modulo operation) in the DCIs scheduling $3^{rd}$ and $4^{th}$ blue PDSCHs, which counts all PDSCHs in the two subsets. To report HARQ-ACK, the UE can include HARQ-ACKs for all 6 PDSCHs by following the C-DAI indication.

In FIG. 10, U1 is received, UE doesn't need to report HARQ-ACK for PDSCH with C-DAI=1 & 2 anymore, so gNB could toggle reset indicator (i.e. value 1) and indicate V-C-DAI=3 & 4 in the DCIs scheduling $3^{rd}$ and $4^{th}$ blue PDSCHs, which only counts PDSCHs in the current subset. To report HARQ-ACK, UE can include HARQ-ACKs for the 4 blue PDSCHs by following V-C-DAI indication of the blue PDSCHs.

In one embodiment, for the above consecutive subsets, C-DAI/T-DAI counts number of PDSCHs in all the above consecutive subsets. If the reset indicator in the DCIs in the second subset other than the above mentioned one or more DCIs is toggled, UE could implicitly adjust the value of C-DAI in the DCIs in the second subset based on the number of PDSCHs in the first subset(s) and use the adjusted C-DAI for determining HARQ codebook.

For example, as shown in FIG. 18 or 19, the first two blue PDSCHs are near to PUCCH U1, gNB cannot prepare scheduling information in these two DCIs considering HARQ-ACK information carried in U1. In these two DCIs, C-DAI=3 & 4 are indicated which count the two earlier PDSCHs with C-DAI=1 & 2. Reset indicator are unchanged (i.e. value 0, not toggled). Starting from the $3^{rd}$ blue PDSCH, gNB could know the reception status of U1. The DCIs scheduling last 2 blue PDSCHs have C-DAI=5 & 6.

In FIG. 18, if U1 is not correctly received, gNB could trigger UE to report HARQ-ACK for PDSCH with C-DAI=1 & 2 again. gNB keeps same value of reset indicator (i.e. value 0, not toggled) in DCI scheduling blue PDSCHs with C-DAI=5 & 6. UE transmits HARQ-ACK of all 6 PDSCHs by C-DAI and does HARQ-ACK transmission on U2.

In FIG. 19, if U1 is correctly received, UE doesn't need to report HARQ-ACK for PDSCH with C-DAI=1 & 2 anymore. Therefore, gNB could toggle the reset indicator (i.e. value 1) in the DCI scheduling last two blue PDSCHs. Since the reset indicator is toggled, UE could assume that HARQ ACKs for the first subset have been correctly received by the gNB. Then, UE could know the first PDSCH in the second subset has a C-DAI=3. Finally, UE can know there are four PDSCHs in the second subset ordered by C-DAI=3, 4, 5, 6. In this, UE can just report 4 HARQ-ACKs for the second subset in U2 even though the last C-DAI value is 6.

In one embodiment, for the above consecutive subsets, C-DAI/T-DAI in the above mentioned one or more DCIs count the number of PDSCHs in all the above consecutive subsets. If the reset indicator in the other DCIs in the second subset is not toggled, C-DAI/T-DAI in the DCIs counts the number of PDSCHs in all the above consecutive subsets; If reset indicator in the other DCIs in the second subset is toggled, C-DAI/T-DAI in the DCIs only counts the number of PDSCHs in the second subset. If reset indicator in the other DCIs in the second subset is toggled, UE could adjust value of C-DAI in the above mentioned one or more DCIs based on the number of PDSCHs in the first subset(s).

As shown in FIG. 20 or 21, the first two blue PDSCHs are near to PUCCH U1, gNB cannot prepare scheduling information in these two DCIs referring HARQ-ACK information carried in U. In these two DCIs, C-DAI=3 & 4 are indicated which count the two earlier PDSCHs with C-DAI=1 & 2. The reset indicator is unchanged (i.e. value 0, not toggled). Starting from the $3^{rd}$ blue PDSCH, gNB could know the reception status of U1. Values of C-DAI in the DCIs scheduling last 2 blue PDSCHs depends on the reset indicator.

In FIG. 20, U1 is not correctly received, gNB could trigger UE to report HARQ-ACK for PDSCH with C-DAI=1 & 2 again. The gNB keeps same value of reset indicator (i.e. value 0, not toggled) in DCI scheduling the last two blue PDSCHs, which are assigned with C-DAI=5 & 6. UE transmits HARQ-ACK of all 6 PDSCHs by C-DAI and does HARQ-ACK transmission on U2.

In FIG. 21, U1 is correctly received, UE doesn't need to report HARQ-ACK for PDSCH with C-DAI=1 & 2 anymore, so gNB could toggle reset indicator (i.e. value 1) in the DCI scheduling last two blue PDSCHs. The last two blue PDSCHs have C-DAI=3 & 4. Since reset indicator is toggled, UE could that HARQ ACKs for the first subset have been correctly received by the gNB. Then, the UE could interpret the C-DAI of the first two blue PDSCHs by 2, so that new C-DAI values becomes 1 & 2. C-DAI of the 4 blue PDSCHs becomes 1, 2, 3, 4. By this way, UE could transmit HARQ-ACK of the four blue PDSCHs by C-DAI.

In on embodiment, a single set of PDSCH is used in HARQ-ACK transmission. Therefore, the HARQ-ACK codebook is determined by reset indicator, C-DAI/T-DAI. In this case, information on set index is not needed in a DCI. for example, the scheme shown in FIG. 9, 10, 18, 19, 20 or 21 could operate if only one set of PDSCH is used in HARQ-ACK transmission. Equivalently, concept of set of PDSCH doesn't need to be defined at all.

Semi-Static HARQ-ACK Transmission Based on HARQ Processes

In semi-static HARQ-ACK codebook, one way to make a fixed codebook size is to transmit HARQ-ACK for all configured HARQ processes or a subset of configured HARQ processes. In this scheme, HARQ-ACK bits for an already transmitted HARQ process in a previous HARQ-ACK transmission are still included in the current HARQ-ACK codebook. One critical issue is to make gNB and UE have the same understanding on the transmitted HARQ-ACK bits for a HARQ process.

The triggering DCI may schedule a PDSCH or only trigger HARQ-ACK transmission of earlier scheduled PDSCHs. For a first HARQ process used by a PDSCH received by UE, if HARQ-ACK of the PDSCH is to be reported on the current HARQ-ACK transmission for the first time HARQ-ACK feedback, HARQ-ACK for the first HARQ process is generated according to the reception status of the PDSCH. Otherwise, the HARQ-ACK for the latest PDSCH of a second HARQ process received by UE is expected to be already transmitted in a previous HARQ-ACK transmission for the first time HARQ-ACK feedback. This could happen if UE receives a trigger DCI which schedules a PDSCH with a different HARQ process or only trigger HARQ-ACK transmission. There are 4 cases for the second HARQ process, Case 1): for the HARQ process, UE already sent its HARQ-ACK and gNB correctly received the HARQ-ACK;

Case 2): for the HARQ process, UE sends its HARQ-ACK, but gNB fails to receive this HARQ-ACK;

Case 3): for the HARQ process, UE fails to pass LBT, hence it cannot transmit PUCCH carrying the HARQ-ACK;

Case 4): for the HARQ process, UE misses DCI with a toggled NDI, hence UE never transmits a PUCCH indicated by the DCI since UE doesn't know there is a new PDSCH scheduled by gNB.

Without other enhancements, a UE cannot distinguish case 4) from case 1). In one embodiment, once UE already sent ACK for a HARQ process in a previous PUCCH, UE should report NACK/DTX for the same HARQ process if no new PDSCH received for the HARQ-ACK process and there is new PUCCH for HARQ-ACK transmission. By this way, UE always reports NACK/DTX for case 1) and 4), though UE cannot distinguish case 1) and 4). After receiving the NACK/DTX, if it is actually case 4), gNB can schedule retransmission for the PDSCH. Such a scheme works; however, UE will also report NACK/DTX in case 2) which causes redundant retransmission of a PDSCH.

In one embodiment, the triggering DCI may schedule a PDSCH or only trigger HARQ-ACK transmission. Here, the DCI could include the latest value of NDI for a HARQ process if HARQ-ACK for the HARQ process is not correctly received; otherwise, it can include a toggled NDI for the HARQ process. For case 1) in FIG. 4, given gNB is sure that there is no confusion on PDSCH transmission using this HARQ process between UE and gNB, gNB could indicate either values of NDI in the triggering DCI. Based on the NDI value, UE can know whether there is a missed PDCCH for the HARQ process. In an extreme case, 16 or 32 bits of NDI values are needed to trigger HARQ-ACK for all 16 HARQ processes with one or two TBs. For example, as shown in FIG. 4, when gNB signals NDI=1 for a HARQ process in the most recent DCI trigging HARQ-ACK transmission in PUCCH resource U3, UE can distinguish case 1)-4) by comparing the latest NDI known by the UE and the NDI (=1) signaled in the most recent DCI for a HARQ process, UE transmits the actual HARQ-ACK for the HARQ process in the current HARQ-ACK codebook, if NDI is not toggled. It is case 1), 2) or 3). For case 1) or 2), though they are still not distinguishable by UE, UE can always transmit the actual HARQ-ACK (ACK in FIG. 4) of PDSCH D2 again to gNB so that gNB can know the D2 is correctly received; for case 3), UE can transmit the actual HARQ-ACK (ACK in FIG. 4) of D2 to gNB since it is never transmitted yet;

UE reports NACK/DTX for the HARQ process in the current HARQ-ACK codebook, if NDI is toggled. It is case 4). UE eventually realizes it must miss a PDCCH with NDI=1 scheduling D2, therefore the UE can report NACK/DTX.

In one embodiment, when UE reports its HARQ-ACK to gNB in a PUCCH, UE can include the latest NDI at UE side for each HARQ process. In an extreme case, 16 or 32 bits of latest NDI are included in the HARQ-ACK codebook for all 16 HARQ processes with one for two TBs. gNB can identify case 1)-4) by comparing UE reported latest NDI in PUCCH U3 and the NDI (=1) known by gNB for a HARQ process, It is case 1), 2) or 3) if NDI is not toggled. For case 1), it is duplicated HARQ-ACK information for the HARQ process in gNB point of view; for case 2) and 3), sometimes gNB cannot correctly distinguish these two cases, however, gNB could get the correct HARQ-ACK information (ACK in FIG. 4) for the HARQ process;

It is case 4) if NDI is toggled. gNB could know that UE must miss the PDCCH with NDI=1 scheduling PDSCH D2, therefore gNB can consider a DTX is received for D2.

In one embodiment, the triggering DCI may schedule a PDSCH or only trigger HARQ-ACK transmission, the DCI could include one-bit information, denoted as PUCCH_NDI. PUCCH_NDI could operate in toggled/not toggled manner. PUCCH_NDI could indicate whether UE needs to report HARQ-ACK in the current PUCCH for a latest PDSCH of a HARQ process whose HARQ-ACK is expected to be transmitted in a previous PUCCH for the first time HARQ-ACK feedback. Alternatively, PUCCH_NDI could indicate if a previous PUCCH carrying HARQ-ACK is correctly received by gNB. The scheme can operate on all HARQ processes as a whole or can operate on each subset of HARQ processes separately. Preferably, if a PUCCH is correctly received, gNB can trigger new HARQ-ACK transmission with PUCCH_NDI toggled; If PUCCH is wrong or not detected, gNB triggers HARQ-ACK retransmission with PUCCH_NDI not toggled. For a HARQ process whose HARQ-ACK is expected to be already transmitted in a previous PUCCH, UE reports a NACK/DTX for the HARQ process in the current HARQ-ACK codebook, if UE receives PUCCH_NDI toggled. It is 1) or 4). UE actually cannot distinguish case 1) and 4) for the HARQ process, but UE can always report a NACK/DTX;

If UE receives PUCCH_NDI not toggled, UE reports the actual HARQ-ACK for the HARQ process in the current HARQ-ACK codebook. If UE already transmits the previous PUCCH, it is case 2). UE knows gNB doesn't receive its transmitted PUCCH, therefore UE report the actual HARQ-ACK (ACK in FIG. 4) again. If UE doesn't transmit the previous PUCCH, it is case 3). UE reports the actual HARQ-ACK (ACK in FIG. 4);

As shown in FIG. 5, herein the number in term P{number} means HARQ process number. Since PUCCH_NDI when scheduling HARQ process 4 & 7 is toggled (0 versus 1), UE can report NACK/DTX for HARQ process 0 & 1 and include actual HARQ-ACK for HARQ process 4 & 7. If UE misses a second PDSCH with HARQ process 1, though UE doesn't know its existence, UE anyway reports NACK/DTX for HARQ process 1 in PUCCH U2. On the other hand, as shown in FIG. 6, if PUCCH_NDI is not toggled, UE can report actual HARQ-ACK for all 4 HARQ processes.

In one embodiment, the above scheme based on PUCCH_NDI can operate on a set of PDSCHs identified with the same set index. The set index can be indicated in DCI. Different set of PDSCHs can be interleaved in time. PUCCH_NDI in DCI for PDSCHs with a different set index operates independently.

In one embodiment, a subset of HARQ processes is predefined, preconfigured or configured by RRC, so that UE only reports HARQ-ACK for a subset of HARQ processes to reduce payload size for UCI on PUCCH. A single subset of HARQ processes could be predefined, preconfigured or configured by RRC. Alternatively, multiple subsets of HARQ processes could be predefined, preconfigured or configured by RRC. The subset of HARQ process is explicitly indicated in the triggering DCI. Alternatively, HARQ processes indicated in the triggering DCI implicitly indicate a subset of HARQ process, e.g. this subset contains the HARQ process in the DCI.

In one embodiment, a subset of a set of PDSCHs using a set of HARQ processes could include the PDSCHs whose HARQ-ACKs are expected to transmit on the same PUCCH resource for the first time HARQ-ACK feedback. For consecutive subsets, if there is not enough gNB processing time between a PUCCH resource for the first subset(s) and one or more DCIs scheduling PDSCHs in the second subset, gNB could keep PUCCH_NDI unchanged in the above mentioned one or more DCIs. Alternatively, gNB and UE may just neglect the value of PUCCH_NDI in the above mentioned one or more DCIs. The first subset(s) may be strictly a single subset of the set of PDSCHs using the set of HARQ processes, or the first subset(s) could be actually multiple consecutive subsets having the same PUCCH_NDI. PUCCH_NDI in the above one or more DCIs could be different from PUCCH_NDI in the other DCIs of the second subset. PUCCH_NDI in the other DCIs of the second subset is used to determine HARQ-ACK transmission of all HARQ processes in the second subset. If no DCI in the $2^{nd}$ subset other than the above mentioned one or more DCIs is received, PUCCH_NDI in the above mentioned one or more DCIs could be used to determine HARQ-ACK transmission of the second subset. Alternatively, PUCCH_NDI in a later DCI using the set of HARQ processes is used to derive effective PUCCH_NDI of the second subset.

In the above mentioned one or more DCIs, gNB could indicate a valid value of PDSCH-to-HARQ-ACK-timing. If a DCI other than the above mentioned one or more DCIs is received by UE, UE could rely on PUCCH_NDI in the DCI regarding how to treat HARQ-ACK of HARQ processes used by the first subset(s). Otherwise, UE could report NACK/DTX for the HARQ processes used by the first subset(s), or UE could report actual HARQ-ACK for the HARQ processes used by the first subset(s). Alternatively, in the above mentioned one or more DCIs, gNB could set a special value of K1, i.e. no valid PDSCH-to-HARQ-ACK-timing indicated. If UE doesn't receive any other DCI except the above mentioned one or more DCI, there is no valid PDSCH-to-HARQ-ACK-timing to derive a PUCCH resource. HARQ-ACK retransmission relies on future gNB scheduling. Since UE doesn't transmit PUCCH carrying HARQ-ACK for the PDSCHs without valid PDSCH-to-HARQ-ACK-timing, an additional DCI must trigger HARQ-ACK retransmission by scheduling the same set of HARQ processes at a later time. That is, PUCCH_NDI of the later DCI equals to the PUCCH_NDI of the second subset, and also determine whether to retransmit HARQ-ACK for HARQ processes used by the first subset(s).

As shown in FIG. 15, since PUCCH_NDI when scheduling HARQ process 5 & 6 is toggled (0 versus 1), UE can report NACK/DTX for HARQ process 1 & 2 and include actual HARQ-ACK for HARQ process 3-6. On the other hand, as shown in FIG. 16, if PUCCH_NDI is not toggled for DCI scheduling HARQ process 5 & 6, UE can report actual HARQ-ACK for all HARQ processes 1-6.

In one embodiment, a subset of HARQ processes is predefined, preconfigured or configured by RRC. In a DCI scheduling a PDSCH, a second HARQ process number is indicated in addition to the HARQ process number used in HARQ soft combining. The second HARQ process number is used in forming a HARQ-ACK codebook. The second HARQ process number can be a separate field, hence, it can be carried in all DCI. Alternatively, the second HARQ process number is only included in some of DCIs. For example, for a DCI without valid PDSCH-to-HARQ-ACK timing, ARI and TPC field is actually useless, and these five bits can be reinterpreted to indicate the second HARQ process number; while for a DCI with valid PDSCH-to-HARQ-ACK timing, the second HARQ process number is not indicated. By this way, though there is restriction on gNB's using a HARQ process, e.g. limited by early (re) transmission status, gNB could transform current used HARQ processes into a subset by setting a proper second HARQ process number, so as to compact HARQ-ACK payload size. In this scheme, gNB cannot manage the HARQ process in the DCI used to indicate PDSCH-to-HARQ-ACK timing, PUCCH resource and TPC. However, gNB can always manage the HARQ process in a DCI without valid PDSCH-to-HARQ-ACK timing.

Assuming maximum 16 HARQ processes are configured, which is divided into 4 subsets, 0~3, 4~7, 8~11, 12~15, HARQ-ACK feedback per subset is transmitted as one PUCCH. As shown in FIG. 17, Assuming gNB has to schedule HARQ process 1, 14, 9, 6 for HARQ soft combining, and assuming gNB wants to pretend subset 4-7. PDSCH scheduled by DCI with HARQ process number=6 is the one with valid K1, hence number 6 cannot be changed. In fact, there is no other field in DCI that can be used to change it to a different HARQ process number. For PDSCH scheduled by DCI with HARQ process number field=1, 14, 9, a second HARQ process number 4, 5, 7 is indicated respectively by reusing ARI & TPC. Finally, a 4-bit HARQ-ACK codebook is formed for HARQ process number 4, 5, 6 and 7.

In one embodiment, a field in DCI is to trigger HARQ-ACK transmission for a subset of HARQ processes or all HARQ processes. If it is per subset HARQ-ACK transmission, it can further indicate the subset triggered. For example, as shown in Table 1, assuming 2 bit is used as the trigger, one option is to indicate HARQ-ACK transmission for 16 HARQ processes, HARQ processes 0-7 and HARQ processes 8-15. The remaining code point could indicate HARQ-ACK transmission for HARQ processes 0-3. Another option is to indicate HARQ-ACK transmission for 16 HARQ processes, HARQ processes 0-7, HARQ processes 0-5 and HARQ processes 0-3, assuming HARQ process number can be managed to form a HARQ-ACK codebook, e.g. relying on second HARQ process number as proposed in above embodiment.

TABLE 1

| Trigger for subset or full set of HARQ-ACK feedback | | |
|---|---|---|
| code point | option 1 | option 2 |
| 00 | 0-15 | 0-15 |
| 01 | 0-7 | 0-7 |
| 10 | 8-15 | 0-5 |
| 11 | 0-3 | 0-3 |

Semi-Static HARQ-ACK Transmission Based on Configured PDSCH-to-HARQ-ACK Timings

Semi-static HARQ-ACK codebook is simply formed based on configured PDSCH-to-HARQ-ACK timings, i.e., the number of HARQ-ACK is same as the possible candidates of PDSCH-to-HARQ-ACK timings, which can be configured by RRC. The semi-static UL-DL-configurations for TDD is used to further reduce the codebook size. In NR-U, it is likely some DCI scheduling a PDSCH may not include valid PDSCH-to-HARQ-ACK timing, which impacts semi-static HARQ-ACK codebook.

In one embodiment, to account for DCI without valid PDSCH-to-HARQ-ACK timing, HARQ-ACK bits for X slots are always added to the HARQ-ACK codebook derived by valid PDSCH-to-HARQ-ACK timings. X can be configured by RRC, determined based on UE capability, or fixed in the specification. For example, the interval of X slots should be equal to or larger than UE processing time for PDSCH reception, so that UE has time to get HARQ-ACK for all possible PDSCHs located in the ending slots of a previous channel occupation time (COT) in the worst case. HARQ-ACK for the above X slots can be sorted in time, alternatively, C-DAI field can be used to order the HARQ-ACK for the PDSCH in the X slots. For example, for a DCI without valid PDSCH-to-HARQ-ACK timing, ARI and TPC field is actually useless, and these bits can be reinterpreted to indicate C-DAI, so that it doesn't increase the DCI size. As shown in FIG. 7, HARQ-ACK for 3 slots are added to 5-bit HARQ-ACK codebook derived by valid PDSCH-to-HARQ-ACK timings.

In one embodiment, slot format indicator (SFI) signaled by DCI format 2_0 can be used to reduce the codebook size. For a SLIV conflicted with 'U' symbol in SFI, no HARQ-ACK is allocated. In one embodiment, if DL or UL BWP switching happens, HARQ-ACK of impacted PDSCH can be removed from the semi-static HARQ-ACK codebook. In one embodiment, for a slot outside gNB-initiated COT, no HARQ-ACK is allocated.

Increase Opportunities for HARQ-ACK Transmission

A DCI may schedule a PDSCH or only trigger HARQ-ACK transmission. The DCI will indicate the PUCCH resources used for HARQ-ACK transmission. The DCI could indicate a LBT type used for starting PUCCH transmission. If the indicated PUCCH is inside a COT, one-shot LBT, e.g. 25 us CCA could be used by UE to start PUCCH transmission. If the indicated PUCCH is immediately following a DL transmission within Ns us, e.g. Ns equals to 16, UE could transmit the PUCCH without doing LBT, denoted as LBT CAT-1. If the indicated PUCCH is outside a COT, CAT-4 LBT has to be used by UE to start PUCCH transmission. The DCI could indicate one from the three LBT types used for starting PUCCH transmission, i.e. 2 bits could be signaled in the DCI. Alternatively, UE derives the LBT type to start PUCCH transmission by the DCI and COT sharing information, e.g. slot format information (SFI) by DCI 2_0. To check a PUCCH is within a COT or not, if a 'F' symbol indicated by SFI may mean a period not belonging the COT, condition for the check is that the PUCCH is overlapped with at least one symbol indicated as 'U' symbol by SFI. Alternatively, a PUCCH overlapped with either 'F' symbol and/or 'U' symbol by SFI is considered within a COT.

In one embodiment, the DCI could indicate 1-bit information on whether CAT-1 LBT is used. If the 1-bit information indicate the use of CAT-1 LBT, UE uses CAT-1 LBT to start PUCCH transmission. If not, UE checks COT sharing information. If the indicated PUCCH is within a COT, UE uses CAT-2 LBT to start PUCCH transmission; otherwise, CAT-4 LBT is used.

In one embodiment, the DCI could indicate 1-bit information to differentiate CAT-1 LBT and CAT-4 LBT. If the 1-bit information indicate the use of CAT-1 LBT, UE uses CAT-1 LBT to start PUCCH transmission. If the 1-bit information indicate the use of CAT-4 LBT, UE checks COT sharing information and derives a LBT type.

In one embodiment, if CAT-4 LBT is indicated by the DCI, UE checks COT sharing information and derives a LBT type to start PUCCH transmission. If the indicated PUCCH is within a COT, UE changes LBT to CAT-2 LBT to start PUCCH transmission; otherwise, CAT-4 LBT is used. gNB could indicate the boundary of CAT-1 LBT, e.g. by DCI 2_0 together with the indication of slot format. For example, the boundary could be the start of a symbol. Alternatively, the boundary could be Ns us after the start of a symbol. In this case, if the indicated PUCCH start right from the boundary, UE changes LBT to CAT-1 LBT to start PUCCH transmission; if the indicated PUCCH is within a COT but not start from the boundary, UE changes LBT to CAT-2 LBT to start PUCCH transmission; otherwise, CAT-4 LBT is used. In one embodiment, if CAT-2 LBT is indicated by the DCI, and if the indicated PUCCH starts right from the boundary, UE changes LBT to CAT-1 LBT to start PUCCH transmission; otherwise, CAT-2 LBT is used.

In one embodiment, there exist multiple DL to UL and UL to DL switching points. Multiple DCI 2_0 could be transmitted to indicate the slot formats. A DCI 2_0 could only indicate one boundary for CAT-1 LBT. Preferably, a DCI 2_0 only indicates the first boundary for CAT-1 LBT at least Nb symbols after the DCI 2_0. Nb is to account for UE processing time, propagation delay and etc. Nb is predefined or configured by RRC signaling. The boundary could be indicated as an offset from the timing of the DCI 2_0. The boundary could be indicated as an offset from the first 'F' symbol after the DCI 2_0. The boundary could be indicated as an offset from the first 'F' or 'U' symbol after the DCI 2_0. The boundary could be indicated as an offset from the first 'F' symbol LBT at least Nb symbols after the DCI 2_0. The boundary could be indicated as an offset from the first 'F' or 'U' symbol LBT at least Nb symbols after the DCI 2_0.

To provide more opportunities of PUCCH for the mitigation of LBT failure, a DCI could indicate multiple values of K1 for PDSCH-to-HARQ-ACK timings, so that multiple PUCCH resources for HARQ-ACK transmission can be indicated by the DCI. In one embodiment, the same LBT types applies to all PUCCHs corresponding to the multiple values of K1. In one embodiment, UE needs to individually derive the LBT type applies to each PUCCH corresponding to the multiple values of K1. As shown in FIG. 11, the first PUCCH of the two PUCCHs indicated by the DCI is within a COT and use CAT-2 LBT. While, the second PUCCH of the two PUCCHs indicated by the DCI is outside the COT and use CAT-4 LBT.

Group Triggering HARQ-ACK Transmission and Retransmission

The HARQ-ACK for a PDSCH scheduled in a COT may not be able to transmit in the same COT. As shown in FIG. 12, this is caused by the limitation of UE processing time and/or propagation delay, etc. In this case, CAT-4 LBT could be used to start the PUCCH transmission carrying HARQ-ACK. However, it is general understanding that CAT-4 LBT may fails right before the PUCCH resource due to the channel contention from other devices. Methods to increase the probability for PUCCH transmission could be considered.

In one embodiment, if the indicated PUCCH is inside a COT, the DCI only indicates a single value of K1 for PDSCH-to-HARQ-ACK timing, i.e. a single PUCCH is indicated. Otherwise, the DCI could indicate multiple values of K1 for PDSCH-to-HARQ-ACK timings, i.e. multiple PUCCHs are indicated with CAT-4, which increases the channel access opportunities.

To provide more opportunities of PUCCH for the mitigation of LBT failure, if gNB could initiate a second COT before the previously indicated PUCCH (U2 in FIG. 12) using CAT-4 LBT and share the second COT to UE, UE could change LBT type of U2 from CAT-4 to CAT-1 or CAT-2. In one embodiment, if the indicated PUCCH is within the $2^{nd}$ a COT, UE changes LBT to CAT-2 LBT to start PUCCH transmission; otherwise, CAT-4 LBT is used. In one embodiment, if the indicated PUCCH start right from the boundary of CAT-1 LBT, UE changes LBT to CAT-1 LBT to start PUCCH transmission; if the indicated PUCCH is within a COT but not start from the boundary, UE changes LBT to CAT-2 LBT to start PUCCH transmission; otherwise, CAT-4 LBT is used.

It is possible that, when gNB initiates a second COT, there is not enough time to share COT to a previous indicated PUCCH. Further, when gNB initiates a second COT, it is possible that the start timing of the second COT is even after the previous indicated PUCCH. In the slot carrying the previous indicated PUCCH, typically multiple PUCCHs for HARQ-ACK transmissions of different UEs are multiplexed in the slot. Due to the contention of other devices, it is possible one or multiple UEs fail in CAT-4 LBT hence the PUCCHs are dropped. To save overhead in triggering HARQ-ACK retransmission, it is beneficial that gNB could trigger the above one or multiple UEs failed in LBT for PUCCH by a group-triggering DCI (GT-DCI). DT-DCI could be DCI 2_0 which indicates slot formats and acts as a group trigger. GT-DCI could be another DCI just acting as a group trigger. The same PUCCH frequency resource as the previous indicated PUCCH for a UE could still be allocated to the UE. One issue is to determine the time resource of the new PUCCH.

In one embodiment, a time offset is indicated by the GT-DCI. For a group of UEs fail in PUCCH transmission with CAT-4 LBT derived by the previous indicated PDSCH-to-HARQ-timing K1, timing of the new PUCCH is then derived by K1 and the time offset Δ. E.g. slot timing of the new PUCCH is K1+Δ. If the new PUCCH resource in slot K1+Δ is overlapped with 'F' symbol and/or 'U' symbol by SFI, UE could actually transmit the PUCCH. One special value of the offset field could be used to indicate that grouping triggering is disabled. For the group of UEs, CAT-2 LBT could be used to start new PUCCH transmissions. Alternatively, assuming DCI 2_0 of the $2^{nd}$ COT indicates the boundary of CAT-1 LBT, for the group of UEs, if the indicated PUCCH of a UE start right from the boundary of CAT-1 LBT, the UE changes LBT to CAT-1 LBT to start PUCCH transmission; otherwise, CAT-2 LBT is used.

As shown in FIG. 13, a UE is allocated a previous PUCCH resource following PDSCH-to-HARQ-timing K1 but fails in PUCCH transmission. After receiving DCI 2_0 in the $2^{nd}$ COT which indicate an offset 4, UE checks and know slot corresponding to slot K1+4 is a valid uplink in the second COT. Therefore, UE could transmit PUCCH with CAT-1 or CAT-2 LBT in slot K1+4 in the same PUCCH frequency resource as the previous PUCCH.

As shown in FIG. 14, a UE is allocated a previous PUCCH resource following PDSCH-to-HARQ-timing K1. gNB initiates a second COT and transmits DL transmissions in the beginning slot(s), which blocks the LBT operation for the previous PUCCH at UE. In fact, after decoding of DCI 2_0 in the $2^{nd}$ COT which indicates an offset 2, UE checks and know slot corresponding to slot K1+2 is a valid uplink. Therefore, UE could know that gNB intentionally shifts the previous PUCCH to a new time position. UE transmits PUCCH with CAT-1 or CAT-2 LBT in slot K1+2 in the same PUCCH frequency resource as the previous PUCCH resource.

This disclosure provides details on transmission and retransmission of HARQ-ACK. In some embodiments, the gNB triggers HARQ-ACK transmission for a current set of PDSCH and, if needed, a previous set of PDSCH. In some embodiments, a DCI indicates a current set index and a previous set index, C-DAI is incremented based on the last DCI of the previous set, T-DAI indicates the total number of DCIs until now in the previous set and the current set. In some embodiments, a set index is assigned to a set of PDSCHs, and HARQ-ACK is determined for the set of PDSCHs with same set index. In some embodiments, the set of PDSCHs includes PDSCHs with allocated PUCCH resource for the first time, PDSCHs never assigned a PUCCH resource and/or PDSCHs already assigned a PUCCH resource at an earlier time but failed in HARQ-ACK transmission. In some embodiments, a DCI indicates a set index and a reset indicator; C-DAI is incremented across all DCIs with the same set index with reset indicator not toggled, the first DCI with reset indicator toggled has C-DAI equal to 1; T-DAI indicates the total number of DCIs till now across all DCIs with the same set index with reset indicator not toggled. In some embodiments, a normal DCI triggers HARQ-ACK transmission for one or multiple sets of PDSCHs, while a fallback DCI triggers HARQ-ACK transmission for one set of PDSCHs, or a fallback DCI triggers HARQ-ACK transmission for all sets of PDSCHs. In some embodiments, when a PUSCH is scheduled to a UE by a DCI, HARQ-ACK transmission on PUSCH is done by one of the following schemes:

if one-shot HARQ-ACK feedback is indicated by the DCI, HARQ-ACKs for all the HARQ processes is reported by the UE, otherwise, the UE transmits HARQ-ACKs on PUSCH only if the PUSCH is overlapped with a PUCCH for HARQ-ACK; or HARQ-ACK transmission on PUSCH is triggered by the DCI; or HARQ-ACK transmission on PUSCH is triggered if the PUSCH is overlapped with a PUCCH for HARQ-ACK transmission.

In some embodiments, one bit is added in DCI to indicate reporting the HARQ-ACK for earlier PDSCHs only, T-DAI is reinterpreted to indicate the set index of the set of PDSCHs. In some embodiments, if there is not enough gNB processing time between a previous PUCCH and the current DCIs scheduling PDSCHs who's HARQ-ACK is on a current PUCCH, two indication of C-DAI/T-DAI are indicated in the DCI, one C-DAI/T-DAI counts number of all PDSCHs, while the other C-DAI/T-DAI only counts the number of PDSCHs scheduled by current DCIs. In some embodiments, if there is not enough gNB processing time between a previous PUCCH and the current DCIs scheduling PDSCHs who's HARQ-ACK is on a current PUCCH, C-DAI/T-DAI in the current DCIs counts number of all PDSCHs. In some embodiments, reset indicator in a later DCI scheduling the set of PDSCHs is used to determine HARQ-ACK transmission of the set of PDSCHs. In some embodiments, for semi-static HARQ-ACK transmission based on HARQ processes, UE reports ACK for a HARQ process only one time. In some embodiments, for semi-static HARQ-ACK transmission based on HARQ processes, a triggering DCI includes the latest value of NDI for a HARQ process if HARQ-ACK for the HARQ process is not correctly received; otherwise includes a toggled NDI for the HARQ process. In some embodiments, for semi-static HARQ-ACK transmission based on HARQ processes, when UE reports its HARQ-ACK, UE includes the latest NDI at UE side for each HARQ process. In some embodiments, for semi-static HARQ-ACK transmission based on HARQ processes, the DCI includes one-bit information indicating one of the following:

whether to report HARQ-ACK for a latest PDSCH of a HARQ process whose HARQ-ACK is expected to transmit in a previous PUCCH for the first time HARQ-ACK feedback; or, if a previous PUCCH carrying HARQ-ACK is correctly received by gNB.

In some embodiments, if there is not enough gNB processing time between a previous PUCCH and the current DCIs scheduling PDSCHs who's HARQ-ACK is on a current PUCCH, PUCCH_NDI in a later DCI scheduling the set of HARQ processes is used to determine HARQ-ACK transmission of the set of HARQ processes. In some embodiments, the schemes operate on all HARQ process as a whole or operate on a subset of HARQ processes separately. In some embodiments, a subset of HARQ processes is explicitly indicated in the triggering DCI; or, HARQ process indicated in the triggering DCI implicitly indicate a subset of HARQ processes. In some embodiments, in a DCI, a second HARQ process number is included and is used in forming a HARQ-ACK codebook. In some embodiments, for semi-static HARQ-ACK transmission based on configured PDSCH-to-HARQ-ACK timing, HARQ-ACK bits for X slots are additionally added to the HARQ-ACK codebook to account for DCI without valid PDSCH-to-HARQ-ACK timing. In some embodiments, SFI is used to reduce the codebook size; if DL or UL BWP switching happens, impacted HARQ-ACK is removed; for a slot outside gNB-initiated COT, no HARQ-ACK is allocated. In some embodiments, a DCI indicate 1-bit information on LBT type for PUCCH. In some embodiments, for a group of UEs fail in PUCCH transmission with CAT-4 LBT derived by a previous indicated PDSCH-to-HARQ-ACK-timing K1, timing of a new PUCCH is derived by K1 and the time offset $\Delta$, K1+$\Delta$, $\Delta$ is signaled in a group-triggering DCI.

In some embodiments, DCI format 1_1 may include a Downlink assignment index—number of bits as defined in the following:
  6 bits if more than one serving cell are configured in the DL and the higher layer parameter NFI-TotalDAI-Included-r16=enable. The 4 MSB bits are the counter DAI and the total DAI for the scheduled PDSCH group, and the 2 LSB bits are the total DAI for the non-scheduled PDSCH group.
  4 bits if only one serving cell are configured in the DL and the higher layer parameter NFI-TotalDAI-Included-r16=enable. The 2 MSB bits are the counter DAI for the scheduled PDSCH group, and the 2 LSB bits are the total DAI for the non-scheduled PDSCH group.

In some embodiments, DCI format 1_1 may include a PDSCH group index—0 or 1 bit.
  1 bit if the higher layer parameter PDSCH-HARQ-ACK-Codebook=enhancedDynamic-r16;
  0 bit otherwise.
  New feedback indicator—0, 1 or 2 bits.
  1 bit if the higher layer parameter PDSCH-HARQ-ACK-Codebook=enhancedDynamic-r16 and the higher layer parameter NFI-TotalDAI-Included-r16 is not configured;
  2 bits if the higher layer parameter PDSCH-HARQ-ACK-Codebook=enhancedDynamic-r16 and the higher layer parameter NFI-TotalDAI-Included-r16=enable; the MSB corresponds to the scheduled PDSCH group, and the LSB corresponds to the non-scheduled PDSCH group, as defined in [TS38.213] clause 9.1.3.3
  0 bit otherwise.
  Number of requested PDSCH group(s)—0 or 1 bit.

1 bit if the higher layer parameter PDSCH-HARQ-ACK-Codebook=enhancedDynamic-r16;

0 bit otherwise.

In some embodiments, for Type-2 HARQ-ACK codebook grouping and HARQ-ACK retransmission, if a UE is provided PDSCH-HARQ-ACK-Codebook=enhancedDynamic-r16, the UE determines HARQ-ACK information for multiplexing in a PUCCH transmission occasion according to the following procedure.

Set g to the value of a PDSCH group index field in a last DCI format that provides a value of g and indicates a PUCCH transmission occasion.

Set i(g) to denote a PUCCH transmission occasion for multiplexing HARQ-ACK information Set k to the value of a PDSCH-to-HARQ_feedback timing field, if any, in a DCI format providing a value of g If the DCI format does not include a PDSCH-to-HARQ_feedback timing field, set k to the value provided by dl-DataToUL-ACK If a UE detects DCI formats with respective PDSCH-to-HARQ_feedback timing field values indicating a same PUCCH transmission occasion and none of the DCI formats that the UE detects after a last PUCCH transmission occasion for g=0 includes a New_Feedback indicator field for g=0, and at least one of the DCI formats is DCI format 1_0, the UE generates HARQ-ACK information only for PDSCH receptions scheduled by detections of DCI format 1_0 and SPS PDSCH releases indicated by detections of DCI format 1_0, as described in Clause 9.1.3.1 or 9.1.3.2 for multiplexing in the PUCCH transmission occasion.

If a DCI format indicating a slot for a PUCCH transmission occasion does not include a New_Feedback indicator field, a PDSCH reception scheduled by the DCI format or a SPS PDSCH release indicated by the DCI format is associated with PDSCH group 0 and a value of h(g) associated with the DCI format is set only if h(g) is provided by another DCI format that provides a value of h(g) for PDSCH group 0 and indicates the slot for the PUCCH transmission occasion.

FIG. 22 illustrates a wireless communication station in accordance with some embodiments. Wireless communication station 200 may be suitable for use as a user equipment (UE) and configured to perform the operations described above. The communication station 200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 200 may include communications circuitry 202 and a transceiver 210 for transmitting and receiving signals to and from other communication stations using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication station 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication station 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 200 may include one or more of a keyboard, a display, a non-volatile memory port, multiple antennas, a graphics processor, an application processor, speakers, and other mobile device elements. The display may be an LCD screen including a touch screen.

Although the communication station 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for operation in a fifth-generation new radio (5G NR) system, the apparatus comprising:
processing circuitry to:
configure the UE for Type-2 Hybrid automatic repeat request (HAW)) acknowledge (ACK) (HARQ-ACK) codebook grouping and HARQ-ACK retransmission;
decode a downlink control information (DCI) format for scheduling a physical downlink shared channel (PDSCH) group of one or more PDSCHs; the DCI format including a downlink assignment index (DAI) comprising a counter DAI (C-DAI) for a scheduled PDSCH group and a total DAI (T-DAI) for a non-scheduled PDSCH group;
configure the UE to retransmit, for HARQ-ACK retransmission, HARQ-ACK bits from more than one PDSCH group for multiplexing in a physical uplink control channel (PUCCH) transmission occasion scheduled by the DCI format; and
generate HARQ-ACK bits only for PDSCH receptions scheduled by the DCI format for multiplexing in the PUCCH transmission occasion when the DCI format includes a reset feedback indicator for the Type-2 HARQ-ACK codebook grouping and HARQ-ACK retransmission and when no DCI formats that are detected after a last PUCCH transmission occasion include the reset feedback indicator, the reset feedback indicator indicating a number of requested PDSCH groups including the scheduled PDSCH group and the non-scheduled PDSCH group; and
a memory to store the HARQ-ACK bits.

2. The apparatus of claim 1, wherein when a most recently received DCI format is DCI format 1_1, the processing circuitry is to configure to UE to report HARQ-ACK bits for a current PDSCH group and one or more other PDSCH groups when indicated by the DCI format 1_1, and
wherein when the most recently received DCI format is DCI format and when an earlier received DCI format 1_1 scheduled a same PDSCH group, the processing circuitry is to configure to UE to report HARQ-ACK bits for a current PDSCH group and one or more other PDSCH groups when indicated by the earlier DCI format 1_1.

3. The apparatus of claim 2, wherein when one serving cell is scheduled in a downlink, the DAI comprises the C-DAI for the scheduled PDSCH group and the T-DAI for the non-scheduled PDSCH group, and
wherein when more than one serving cell is scheduled in the downlink, the DAI comprises the C-DAI and a second T-DAI for the scheduled PDSCH group the T-DAI for the non-scheduled PDSCH group.

4. The apparatus of claim 2, wherein the processing circuitry is further configured to decode radio-resource control (RRC) signalling to configure the UE for the Type-2 HARQ-ACK codebook grouping and HARQ-ACK retransmission.

5. The apparatus of claim 1, wherein when there is no reset feedback indicator in the DCI format for a current PDSCH group, the processing circuitry is configured to report HARQ-ACK for the current PDSCH group without retransmitting HARQ-ACK bits from other PDSCH groups.

6. The apparatus of claim 1, wherein DCI format includes a field indicating a number of PDSCH groups for which the HARQ-ACK bits are to be reported.

7. The apparatus of claim 6, wherein the DAI further includes a second T-DAI and a second reset feedback indicator for a non-scheduled PDSCH group.

8. The apparatus of claim 7, wherein the processing circuitry is further configured to:
sort HARQ-ACK bits based on the C-DAI; and
derive a HARQ-ACK codebook size based on the T-DAI and the reset feedback indicator.

9. The apparatus of claim 1, wherein for a PUCCH transmission in unlicensed spectrum (NR-U), the processing circuitry is to:
configure the UE to perform a listen before talk (LIST) operation before the PUCCH transmission unless the PUCCH transmission immediately follows the PDSCH receptions.

10. The apparatus of claim 1, wherein the processing circuitry comprises a baseband processor.

11. A non-transitory computer-readable storage medium that stores instructions for execution by processing circuitry of a user equipment (UE) configured for operation in a fifth-generation new radio (5G NR) system, the processing circuitry to:
configure the UE for Type-2 Hybrid automatic repeat request (HARQ) acknowledge (ACK) (HARQ-ACK) codebook grouping and HARQ-ACK retransmission;
decode a downlink control information (DCI) format for scheduling a physical downlink shared channel (PDSCH) group of one or more PDSCHs, the DCI format including a downlink assignment index (DAI) comprising a counter DAI (C-DAI) for a scheduled PDSCH group and a total DAI (T-DAI) for a non-scheduled PDSCH group;
configure the UE to retransmit, for HARQ-ACK retransmission, HARQ-ACK bits from more than one PDSCH group for multiplexing in a physical uplink control channel (PUCCH) transmission occasion scheduled by the DCI format; and
generate HARQ-ACK bits only for PDSCH receptions scheduled by the DCI format for multiplexing in the PUCCH transmission occasion when the DCI format includes a reset feedback indicator for the Type-2 HARQ-ACK codebook grouping and HARQ-ACK retransmission and when no DCI formats that are detected after a last PUCCH transmission occasion include the reset feedback indicator, the reset feedback indicator indicating a number of requested PDSCH groups including the scheduled PDSCH group and the non-scheduled PDSCH group.

12. The non-transitory computer-readable storage medium of claim 11, wherein when a most recently received DCI format is DCI format 1_1, the processing circuitry is to configure to UE to report HARQ-ACK bits for a current PDSCH group and one or more other PDSCH groups when indicated by the DCI format 1_1, and wherein when the most recently received DCI format is DCI format 1_0, and when an earlier received DCI format scheduled a same PDSCH group, the processing circuitry is to configure to UE to report HARQ-ACK bits for a current PDSCH group and one or more other PDSCH groups when indicated by the earlier DCI format 1_1.

13. The non-transitory computer-readable storage medium of claim 12, wherein when one serving cell is scheduled in a downlink, the DAT comprises the C-DAI for the scheduled PDSCH group and the T-DAI for the non-scheduled PDSCH group, and wherein when more than one serving cell is scheduled in the downlink, the DAI comprises the C-DAI and a second T-DAI for the scheduled PDSCH group the T-DAI for the non-scheduled PDSCH group.

14. The non-transitory computer-readable storage medium of claim 12, wherein the processing circuitry is further configured to decode radio-resource control (RRC) signalling to configure the UE for the Type-2 HARQ-ACK codebook grouping and HARQ-ACK retransmission.

15. The non-transitory computer-readable storage medium of claim 11, wherein when there is no reset feedback indicator in the DCI format for a current PDSCH group, the processing circuitry is configured to report HARQ-ACK for the current PDSCH group without retransmitting HARQ-ACK bits from other PDSCH groups.

16. The non-transitory computer-readable storage medium of claim 11, wherein DCI format includes a field indicating a number of PDSCH groups for which the HARQ-ACK bits are to be reported.

17. The non-transitory computer-readable storage medium of claim 16, wherein the DAI further includes a second T-DAI and a second reset feedback indicator for a non-scheduled PDSCH group.

18. The non-transitory computer-readable storage medium of claim 17, the processing circuitry is further configured to:

sort HARQ-ACK bits based on the C-DAI; and derive a HARQ-ACK codebook size based on the T-DAI and the reset feedback indicator.

19. An apparatus of a fifth-generation Node B (gNB), the apparatus comprising:

processing circuitry to:

encode RRC signalling for transmission to a user equipment (UE), the RRC signalling to configure the UE for Type-2 HARQ-ACK codebook grouping and HARQ-ACK retransmission;

encode a downlink control information (DCI) format, for transmission to the UE, for scheduling a physical downlink shared channel (PDSCH) group of one or more PDSCHs, the DCI format including a downlink assignment index (DAI) comprising a counter DAI (C-DAI) for a scheduled PDSCH group and a total DAI (T-DAI) for a non-scheduled PDSCH group;

decode a physical uplink control channel (PUCCH) from the UE in a PUCCH transmission occasion scheduled by the DCI format that includes retransmitted HARQ-ACK bits multiplexed from more than one PDSCH group; and decode the PUCCH from the UE in the PUCCH transmission occasion that includes HARQ-ACK bits multiplexed only generated from PDSCH receptions scheduled by the DCI format when the DCI format included a reset feedback indicator for the Type-2 HARQ-ACK codebook grouping and HARQ-ACK retransmission and when no DCI formats were transmitted to the HE after a last PUCCH transmission occasion include the reset feedback indicator, the reset feedback indicator indicating a number of requested PDSCH groups including the scheduled PDSCH group and the non-scheduled PDSCH group; and a memory to store the DCI format.

20. The apparatus of claim 19, wherein when a most recently DCI format transmitted to the UE is DCI format 1_1, the processing circuitry is to receive reported HARQ-ACK bits for a current PDSCH group and one or more other PDSCH groups when indicated by the DCI format 1_1, and wherein when the most recently received DCI format is DCI format 1_0, and when an earlier received DCI format 1_1 scheduled a same PDSCH group, the processing circuitry is to receive reported HARQ-ACK bits for a current PDSCH group and one or more other PDSCH groups when indicated by the earlier DCI format 1_1.

* * * * *

UNITED STATES PATENT AND TRADEMARK OFFICE
CERTIFICATE OF CORRECTION

PATENT NO. : 11,496,252 B2  Page 1 of 1
APPLICATION NO. : 17/061215
DATED : November 8, 2022
INVENTOR(S) : Li et al.

It is certified that error appears in the above-identified patent and that said Letters Patent is hereby corrected as shown below:

In the Claims

In Column 33, Line 16, in Claim 1, delete "(HAW))" and insert --(HARQ)-- therefor In Column 33, Line 21, in Claim 1, delete "PDSCHs;" and insert --PDSCHs,-- therefor In Column 33, Line 49, in Claim 2, (First Occurrence), after "format", insert --1_0,--

In Column 34, Line 23, in Claim 9, delete "(LIST)" and insert --(LBT)-- therefor In Column 35, Line 3, in Claim 12, after "format", insert --1_1--

In Column 35, Line 10, in Claim 13, delete "DAT" and insert --DAI-- therefor

In Column 35, Line 39, in Claim 18, before "the processing", insert --wherein--

In Column 36, Line 25, in Claim 19, delete "HE" and insert --UE-- therefor

Signed and Sealed this
Twenty-second Day of August, 2023

Katherine Kelly Vidal
*Director of the United States Patent and Trademark Office*